US009500256B2

(12) United States Patent
Yamashita et al.

(10) Patent No.: US 9,500,256 B2
(45) Date of Patent: Nov. 22, 2016

(54) SUSPENSION DEVICE

(71) Applicant: HITACHI AUTOMOTIVE SYSTEMS, LTD., Hitachinaka-shi, Ibaraki (JP)

(72) Inventors: Mikio Yamashita, Zama (JP); Fumiyuki Yamaoka, Sagamihara (JP)

(73) Assignee: HITACHI AUTOMOTIVE SYSTEMS, LTD., Hitachinaka-shi, Ibaraki (JP)

( * ) Notice: Subject to any disclaimer, the term of this patent is extended or adjusted under 35 U.S.C. 154(b) by 0 days.

(21) Appl. No.: 14/429,136

(22) PCT Filed: Sep. 11, 2013

(86) PCT No.: PCT/JP2013/074518
§ 371 (c)(1),
(2) Date: Mar. 18, 2015

(87) PCT Pub. No.: WO2014/045965
PCT Pub. Date: Mar. 27, 2014

(65) Prior Publication Data
US 2015/0247547 A1    Sep. 3, 2015

(30) Foreign Application Priority Data

Sep. 20, 2012  (JP) ................................ 2012-206571

(51) Int. Cl.
*F16F 9/512* (2006.01)
*F16F 9/348* (2006.01)
(Continued)

(52) U.S. Cl.
CPC ............... *F16F 9/512* (2013.01); *B60G 21/06* (2013.01); *F16F 9/32* (2013.01); *F16F 9/348* (2013.01);
(Continued)

(58) Field of Classification Search
CPC .............. F16F 9/348; F16F 9/48; F16F 9/50; F16F 9/32; F16F 9/512; B60G 21/06; B60G 2206/41; B60G 2500/11; B60G 2800/012; B60G 2800/014; B60G 2204/8304

USPC .......... 188/313, 317, 322.13, 322.15, 266.2, 188/282.4; 280/5.507, 5.515, 5.519; 701/37, 38
See application file for complete search history.

(56) References Cited

U.S. PATENT DOCUMENTS 5,324,066 A     6/1994  Masamura et al.
5,638,275 A *   6/1997  Sasaki ................ B60G 17/0152
                                                    280/5.505
(Continued)

FOREIGN PATENT DOCUMENTS

GB    2 231 385    11/1990
JP    61-27710      2/1986
(Continued)

OTHER PUBLICATIONS

International Search Report for PCT/JP2013/074518, mailed Oct. 22, 2013, 2 pages.
(Continued)

*Primary Examiner* — Thomas J Williams
*Assistant Examiner* — Mariano Sy
(74) *Attorney, Agent, or Firm* — Nixon & Vanderhye P.C.

(57) ABSTRACT

This suspension device is provided with a shock absorber (5) that is capable of altering damping force using the position of a piston rod (18) such that at least any one of the following characteristics are achieved, namely, first characteristics in which, within a range where the piston rod (18) is extending out from a cylinder (11) beyond a first predetermined position, the extension-side damping force is in a soft state and the compression-side damping force is in a hard state, and second characteristics in which, within a range where the piston rod (18) is retracted inside the cylinder (11) beyond a second predetermined position, the extension-side damping force is in a hard state and the compression-side damping force is in a soft state; and an operating force adjustment mechanism that is capable of adjusting at least one of the operating force in the roll direction of a vehicle, and the operating force in a pitch direction of the vehicle.

16 Claims, 17 Drawing Sheets

(51) Int. Cl.
*F16F 9/48* (2006.01)
*F16F 9/50* (2006.01)
*F16F 9/32* (2006.01)
*B60G 21/06* (2006.01)

(52) U.S. Cl.
CPC . *F16F 9/48* (2013.01); *F16F 9/50* (2013.01); *B60G 2204/8304* (2013.01); *B60G 2206/41* (2013.01); *B60G 2500/11* (2013.01); *B60G 2800/012* (2013.01); *B60G 2800/014* (2013.01)

(56) References Cited

U.S. PATENT DOCUMENTS

| | | | | |
|---|---|---|---|---|
| 6,092,011 | A * | 7/2000 | Hiramoto | F16F 9/466 280/5.5 |
| 7,751,959 | B2 * | 7/2010 | Boon | B60G 17/0152 137/613 |
| 8,296,010 | B2 * | 10/2012 | Hirao | B60G 17/06 280/5.507 |
| 8,321,087 | B2 * | 11/2012 | Hayashi | B60G 17/018 180/902 |
| 9,139,065 | B2 * | 9/2015 | Yamashita | F16F 9/342 |
| 2003/0204293 | A1 * | 10/2003 | Shiino | B60G 17/0162 701/37 |
| 2007/0187918 | A1 | 8/2007 | Mizuno et al. | |
| 2009/0085309 | A1 * | 4/2009 | Hirao | B60G 17/015 280/5.503 |
| 2011/0035089 | A1 * | 2/2011 | Hirao | B60G 17/06 701/31.4 |
| 2011/0241299 | A1 * | 10/2011 | Harada | B60T 8/1755 280/5.513 |
| 2012/0078470 | A1 * | 3/2012 | Hirao | B60G 17/08 701/38 |
| 2012/0160620 | A1 | 6/2012 | Yamashita et al. | |

FOREIGN PATENT DOCUMENTS

| | | |
|---|---|---|
| JP | 62-123042 | 8/1987 |
| JP | 2-283928 | 11/1990 |
| JP | 2-283929 | 11/1990 |
| JP | 3-42319 | 2/1991 |
| JP | 5-238227 | 9/1993 |
| JP | 7-27906 U | 5/1995 |
| JP | 8-105485 | 4/1996 |
| JP | 11-342717 | 12/1999 |
| JP | 2003-80916 | 3/2003 |
| JP | 2011-31734 | 2/2011 |
| JP | 2012-140981 | 7/2012 |
| KR | 10-2006-0122960 A | 11/2006 |
| WO | WO 2013/081004 | 6/2013 |

OTHER PUBLICATIONS

Office Action mailed Jun. 5, 2015 in Korean Application No. 10-2014-7027226, with English Translation (7 pages).

* cited by examiner

| STROKE POSITION | DAMPING FORCE | |
|---|---|---|
| | EXTENSION SIDE | COMPRESSION SIDE |
| EXTENDED POSITION | SOFT | HARD |
| COMPRESSED POSITION | HARD | SOFT |

SUSPENSION DEVICE

TECHNICAL FIELD

The present invention relates to a suspension device.

This application is the U.S. national phase of International Application No. PCT/JP2013/074518, filed Sep. 11, 2013, which designated the U.S. and claims priority to Japanese Patent Application No. 2012-206571, filed Sep. 20, 2012, the contents of each of which are incorporated herein by reference.

TECHNICAL BACKGROUND

Displacement sensitive shock absorbers are a type of shock absorber that is used to form a suspension device. An urging spring that urges a disk valve which generates damping force is provided in a displacement sensitive shock absorber. The displacement sensitive shock absorber enables the damping force to be changed by changing the spring force of the urging spring in accordance with the position of a piston relative to a cylinder (see, for example, Patent documents 1 and 2).

DOCUMENTS OF THE PRIOR ART

Patent Documents

[Patent document 1] Japanese Unexamined Patent Application, First Publication No. H2-283928
[Patent document 2] Japanese Unexamined Patent Application, First Publication No. H2-283929

DISCLOSURE OF THE INVENTION

Problems to be Solved by the Invention

In a suspension device that uses this type of shock absorber, there is room for improvement from the standpoint of improving the riding comfort of the vehicle and improving handling stability.

The present invention provides a suspension device that makes it possible to achieve an improvement in the riding comfort of the vehicle and an improvement in handling stability.

Means for Solving the Problem

According to a first aspect of the present invention, a suspension device that is positioned between a vehicle body and a vehicle wheel is provided with a shock absorber, and an operating force adjustment mechanism. The shock absorber has a cylinder inside which an operating fluid is sealed, a piston that is slidably fitted inside the cylinder and divides the cylinder interior into two chambers, a piston rod that is joined to the piston and extends to the outside of the cylinder, a passage that connects the two chambers together such that the operating fluid is able to flow between them as a result of a movement of the piston, a damping force generating mechanism that is provided in the passage and generates damping force by suppressing the flow of the operating fluid that occurs as a result of the movement of the piston, and a damping force adjustment mechanism that is capable of altering the damping force by means of the position of the piston rod such that at least any one of the following characteristics are achieved, namely, first characteristics in which, within a range where the piston rod is extending out from the cylinder beyond a first predetermined position, the extension-side damping force is in a soft state and the compression-side damping force is in a hard state, and second characteristics in which, within a range where the piston rod is retracted inside the cylinder beyond a second predetermined position, the extension-side damping force is in a hard state and the compression-side damping force is in a soft state. The operating force adjustment mechanism is formed such that it is capable of adjusting at least one of the operating force in the roll direction of a vehicle, and the operating force in a pitch direction of the vehicle.

According to a second aspect of the present invention, the operating force adjustment mechanism may adjust at least one of a roll rigidity and a pitch rigidity such that at least one of the roll and the pitch of the vehicle that are generated by an acceleration of the vehicle in a horizontal direction are suppressed.

According to a third aspect of the present invention, the damping force generating mechanism may have a damping valve. The damping force adjustment mechanism may be a spring device that is capable of adjusting the opening angle of the damping valve.

According to a fourth aspect of the present invention, the suspension device may be provided with a second passage that connects the two chambers together such that an operating fluid is able to flow between them via the damping force adjustment mechanism, and a passage area adjustment mechanism that adjusts the passage area using the position of the piston rod may be provided in the second passage.

According to a fifth aspect of the present invention, the passage area adjustment mechanism may adjust the second passage by means of a metering pin.

According to a sixth aspect of the present invention, the damping force generating mechanism may be a damping valve on at least either one of the extension side and the compression side. The damping valve on at least one of the extension side and the compression side may be a pilot-type damping valve having a pilot chamber, and for the second passage to be connected to the pilot chamber.

According to a seventh aspect of the present invention, the second passage may have a passage on at least one of the extension side and the compression side that has a check valve.

Effects of the Invention

According to the above-described suspension device, it is possible to achieve an improvement in the riding comfort of a vehicle and an improvement in handling stability.

DESCRIPTION OF EMBODIMENTS

Hereinafter, each embodiment of the present invention will be described with reference to the drawings.

First Embodiment

A first embodiment of the present invention will be described based on FIG. 1 through FIG. 12. In the following description, in order to facilitate understanding, the bottom side of the drawings will be defined as the one side and also as the bottom side, while, conversely, the top side of the drawings will be referred to as the other side and also as the top side.

Figure 1:
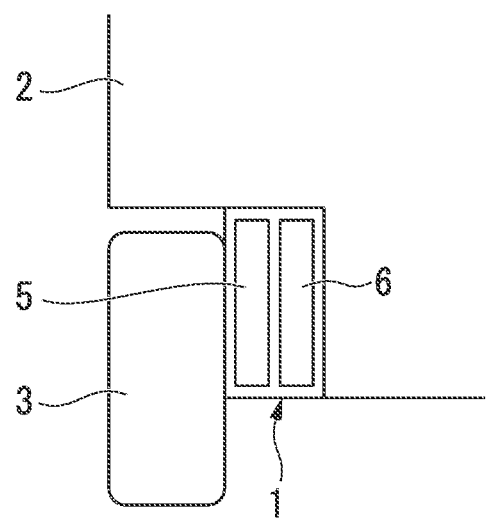
FIG. 1 is a frontal view schematically showing a suspension device according to a first embodiment of the present invention as well as a vehicle wheel and a vehicle body.

As is shown schematically in FIG. 1, a suspension device 1 of the first embodiment is located between a vehicle body 2 and a vehicle wheel 3, and supports the vehicle wheel 3 such that it is able to move up and down relative to the vehicle body 2. A shock absorber 5 and a cylinder device 6 are provided for each vehicle wheel 3 in the suspension device 1. Although not shown in FIG. 1, both a shock absorber 5 and a cylinder device 6 are provided for all four vehicle wheels 3. The shock absorber 5 and the cylinder device 6 are both compressed when the vehicle wheel 3 moves upwards relative to the vehicle body 2, and extend when the vehicle wheel 3 moves downwards relative to the vehicle body 2.

Figure 2:
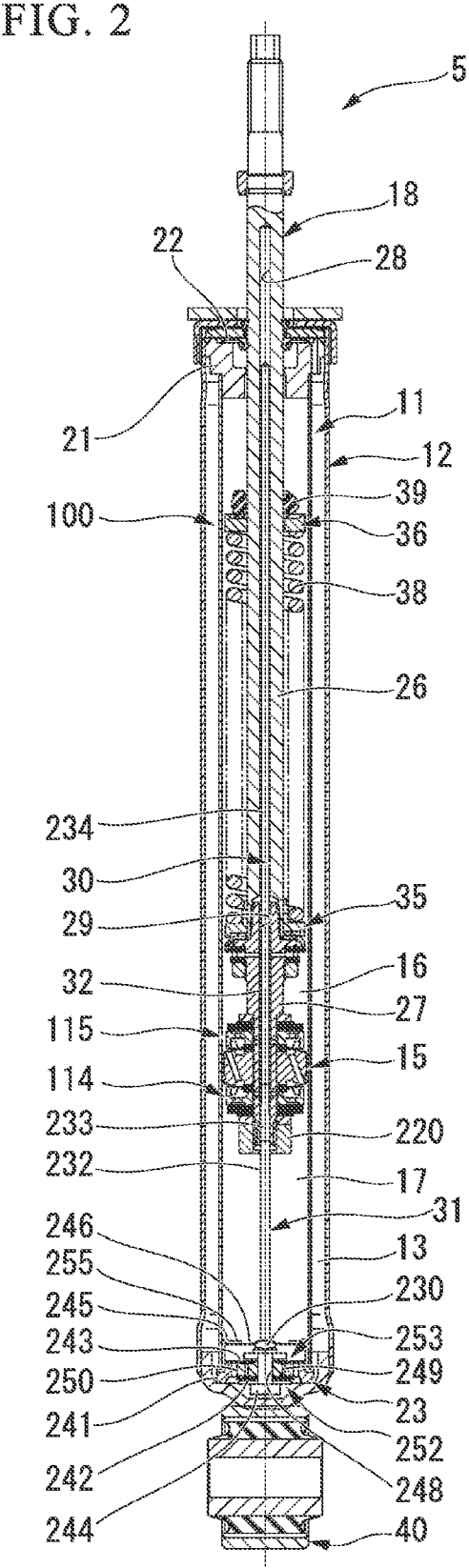
FIG. 2 is a cross-sectional view showing a shock absorber that forms part of the suspension device according to the first embodiment of the present invention.

The shock absorber 5 is a type of shock absorber that adjusts the damping force. As is shown in FIG. 2, the shock absorber 5 is what is known as a double-barrel hydraulic shock absorber. The shock absorber 5 has a circular cylinder-shaped cylinder 11 inside which oil which serves as an operating fluid is sealed, and a closed-end circular cylinder-shaped cylinder 12 that has a larger diameter than that of the cylinder 11 and that is provided concentrically with the cylinder 11 so as to surround the cylinder 11. A reservoir chamber 13 is formed between the cylinder 11 and the outer cylinder 12.

A piston 15 is fitted inside the cylinder 11 such that it is able to slide inside the cylinder 11. This piston 15 divides the interior of the cylinder 11 into an upper chamber 16 and a lower chamber 17. Oil is sealed inside the upper chamber 16 and the lower chamber 17 in the cylinder 11. Oil and gas are sealed inside the reservoir chamber 13 between the cylinder 11 and the outer cylinder 12.

One end of a piston rod 18 extends outside the cylinder 11 while another end thereof is inserted inside the cylinder 11. The piston 15 is joined to the other end portion of the piston rod 18 inside the cylinder 11. The piston rod 18 extends to the outside of the cylinder 11 through a rod guide 21 that is installed in one end aperture portion of the cylinder 11 and the outer cylinder 12, and through an oil seal 22 that is installed in the one end aperture portion of the outer cylinder 12. Outer circumferential portions of the rod guide 21 are formed in a step shape such that an upper portion thereof has a larger diameter than a lower portion thereof. The lower portion of the rod guide 21 is engaged with an inner circumferential portion of the top end of the cylinder 11, while the upper portion of the rod guide 21 is engaged with an inner circumferential portion of the top end of the outer cylinder 12. An inner circumferential portion of the bottom end of the cylinder 11 is engaged with a base valve 23 that is provided in a base portion of the outer cylinder 12, and that separates the lower chamber 17 from the reservoir chamber 13 inside the cylinder 11. A top end portion of the outer cylinder 12 is crimped inwards so that it grips the oil seal 22 and the rod guide 21 between the outer cylinder 12 and the cylinder 11.

The piston rod 18 is formed by a rod main body 26 that is inserted through the rod guide 21 and the oil seal 22 and extends to the outside thereof, and with a distal end rod 27 that is screwed onto an end portion inside the cylinder 11 of the rod main body 26 so as to be integrally joined thereto. An insertion hole 28 that extends in an axial direction is formed in the center in the radial direction of the rod main body 26 extending from the distal end rod 27 side as far as a midway position adjacent to the end portion thereof on the opposite side. A through hole 29 that extends in the axial direction is also formed in the center in the radial direction of the distal end rod 27. The insertion hole 28 and the through hole 29 form an insertion hole 30 for the piston rod 18. A metering pin 31 that is supported on the base valve 23 side is inserted into this insertion hole 30. A space between the insertion hole 30 and the metering pin 31 forms a rod internal passage (i.e., a second passage) 32 through which oil is able to flow inside the piston rod 18.

An annular piston-side spring bearing 35 is provided on the piston 15 side on the outer circumferential side of the rod main body 26 of the piston rod 18, while an annular rod guide-side spring bearing 36 is provided on the opposite side of the piston-side spring bearing 35 from the piston 15. The rod main body 26 is inserted through the inside of the piston-side spring bearing 35 and the rod guide-side spring bearing 36 so that these are able to slide along the rod main body 26. A rebound spring 38 that is formed by a coil spring is interposed between the piston-side spring bearing 35 and the rod guide-side spring bearing 36 such that the rod main body 26 is inserted through the middle of it. An annular shock absorbing body 39 that is formed from an elastic material is provided on the opposite side of the rod guide-side spring bearing 36 from the rebound spring 38. The rod main body 26 is also inserted through the inside of the shock absorbing body 39 so that this is able to slide along the rod main body 26.

One side of this shock absorber 5 is supported, for example, by the vehicle body 2 shown in FIG. 1, while the vehicle wheel 3 is joined to the other side thereof. Specifically, the shock absorber 5 is joined to the vehicle body 2 side via the piston rod 18, and is joined to the vehicle wheel 3 side via a mounting eye 40 that is attached to an outer side of the base portion of the outer cylinder 12. Note that, conversely to this, it is also possible for the other side of the shock absorber 5 to be supported by the vehicle body 2, and for the vehicle wheel 3 side to be fixed to the one side of the shock absorber 5.

Figure 3:
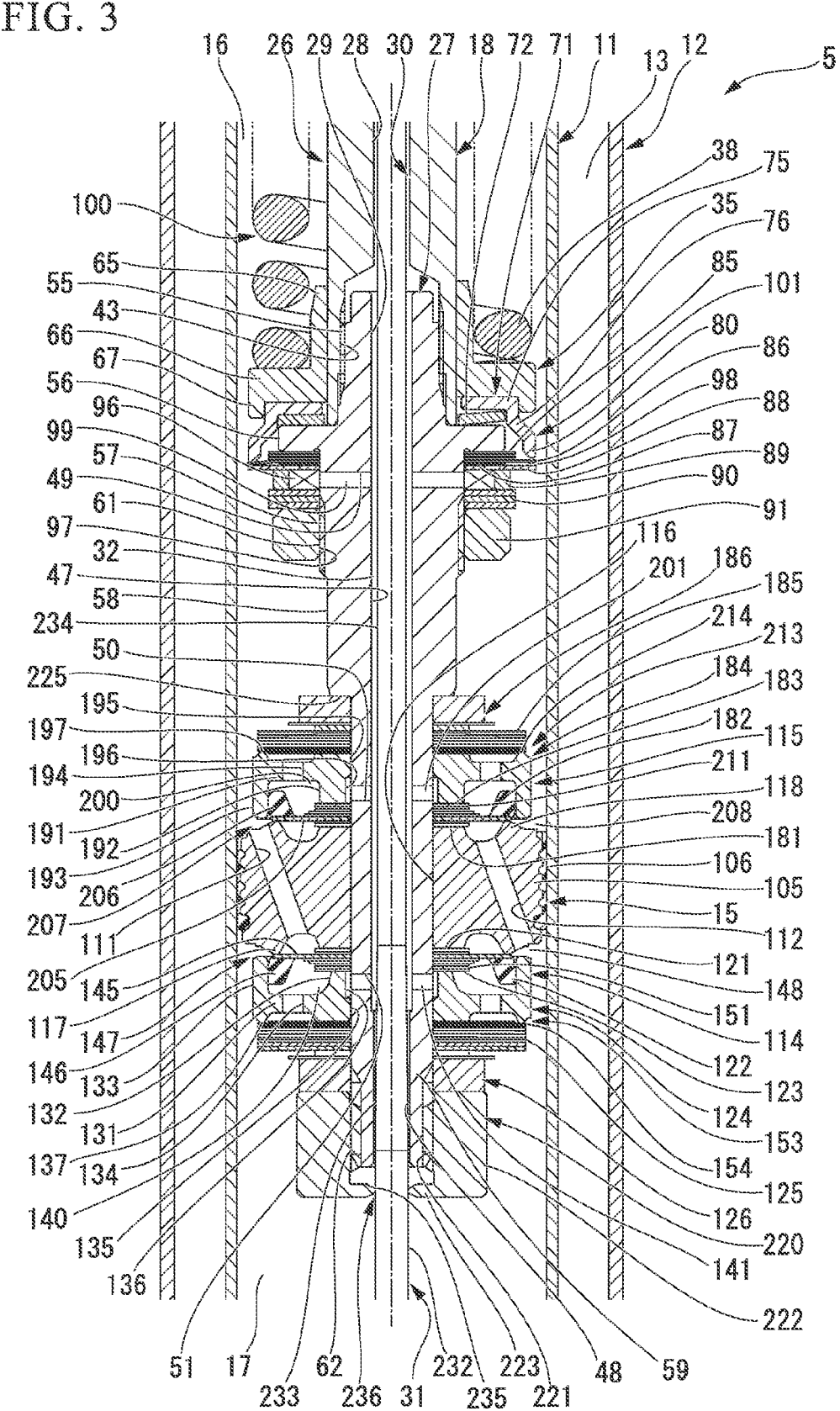
FIG. 3 is a cross-sectional view showing principal portions of the shock absorber shown in FIG. 2.

As is shown in FIG. 3, a screw hole 43 that has a larger diameter than that of the insertion hole 28 and that is communicated with the insertion hole 28 is formed in an end portion of the rod main body 26 on the distal end rod 27 side thereof.

The through hole 29 that forms the rod internal passage 32 of the distal end rod 27 is formed by a large diameter hole portion 47 that is located on the rod main body 26 side, and a small diameter hole portion 48 that is located on the opposite side from the rod main body 26 and has a smaller diameter than that of the large diameter hole portion 47. A passage hole 49, a passage hole 50, and a passage hole 51 are formed in this sequence from the rod main body 26 side such that each passage hole penetrates the distal end rod 27 in the radial direction thereof.

The distal end rod 27 has a screw shaft portion 55, a flange portion 56, a holding shaft portion 57, an intermediate shaft portion 58, and a mounting shaft portion 59 in this sequence in the axial direction from the rod main body 26 side. The screw shaft portion 55 is screwed into the screw hole 43 in the rod main body 26. Because the screw shaft portion 55 abuts against the rod main body 26 when it is being screwed into the screw hole 43, the flange portion 56 is formed having a larger outer diameter than that of the screw shaft portion 55 and the rod main body 26. The holding shaft portion 57 has a smaller diameter than that of the flange portion 56. A male screw 61 is formed on a portion of the holding shaft portion 57 on the opposite side thereof in the axial direction from the flange portion 56. The aforementioned passage hole 49 is formed further to the flange portion 56 side of the holding shaft portion 57 than the male screw 61. The intermediate shaft portion 58 has a slightly smaller outer diameter than the root diameter of the male screw 61 of the holding shaft portion 57. The mounting shaft portion 59 has a diameter further smaller than that of the intermediate shaft portion 58. A male screw 62 is formed on an end portion of the mounting shaft portion 59 on the opposite side thereof in the axial direction from the intermediate shaft portion 58. The aforementioned passage hole 50 is formed in the mounting shaft portion 59 further to the intermediate shaft portion 58 side than the male screw 62 so as to be positioned on the intermediate shaft portion 58 side, while the aforementioned passage hole 51 is formed in the mounting shaft portion 59 so as to be positioned on the male screw 62 side thereof.

The piston-side spring bearing 35 has a circular cylinder-shaped portion 65, an abutment flange portion 66 that extends outwards in the radial direction from one end side in the axial direction of the circular cylinder-shaped portion 65, and a circular cylinder-shaped protruding portion 67 that protrudes slightly from an outer circumferential portion of the abutment flange portion 66 on the opposite side in the axial direction from the circular cylinder-shaped portion 65. When the circular cylinder-shaped portion 65 is positioned on the inner side of the rebound spring 38, the piston-side spring bearing 35 is in contact via the abutment flange portion 66 against an end portion in the axial direction of the rebound spring 38.

A transmission component 71 and a wave spring 72 are interposed between the piston-side spring bearing 35 and the flange portion 56 of the distal end rod 27. The transmission component 71 has an annular shape, and is located on the piston-side spring bearing 35 side of the wave spring 72. The transmission component 71 has a circular plate-shaped base plate portion 75 in which a hole is formed, and a cylindrical portion 76 that extends in an axial direction from outer circumferential edge portions of the base plate portion 75. The cylindrical portion 76 has a step shape in which the opposite side from the base plate portion 75 side has a larger diameter. A chamfer is formed on an inner circumferential side of a distal end portion on the step-shaped portion side of the cylindrical portion 76, so that, as a result, an abutment portion 80 that is thinner in the radial direction than other portions thereof is formed in the distal end portion of the cylindrical portion 76.

The rod main body 26 is inserted through the inside of the transmission component 71. When the base plate portion 75 of the transmission component 71 is fitted inside the protruding portion 67 of the piston-side spring bearing 35, it abuts against the abutment flange 66.

The wave spring 72 has an annular shape when seen in plan view. As is shown on the right side of the centerline in FIG. 3, in its natural state, the wave spring 72 is shaped such that the position thereof in the axial direction is changed by at least one of a change in the position thereof in the radial direction and a change in the position thereof in the circumferential direction. The rod main body 26 is inserted through the inside of the wave spring 72, and the wave spring 72 is placed on the inner side of the cylindrical portion 76 of the transmission component 71, and on the opposite side from the piston-side spring bearing 35 of the base plate portion 75 of the transmission component 71. The wave spring 72 generates urging force when it is elastically deformed so as to become flattened in the axial direction. The wave spring 72 urges the transmission component 71 and the flange portion 56 of the distal end rod 27, which are located at both sides in the axial direction thereof, so that these are separated by a predetermined distance in the axial direction.

Here, when the piston rod 18 moves towards the extension side, namely, towards the upper side where it protrudes from the cylinder 11, the wave spring 72, the transmission component 71, the piston-side spring bearing 35, the rebound spring 38, and the rod guide-side spring bearing 36 and shock absorbing body 39 shown in FIG. 2 move towards the rod guide 21 side together with the flange portion 56 of the distal end rod 27 of the piston rod 18, so that the shock absorbing body 39 abuts against the rod guide 21 at a predetermined position.

When the piston rod 18 moves further in this protruding direction, after the shock absorbing body 39 has been squashed, the shock absorbing body 39 and the rod guide-side spring bearing 36 change to a stationary state relative to the cylinder 11. As a result of this, the flange portion 56, the wave spring 72, the transmission component 71 and the piston-side spring bearing 35, which are shown in FIG. 3, of the moving distal end rod 27 cause the length of the rebound spring 38 to be shortened. The urging force of the rebound spring 38 at this time provides resistance to the movement of the piston rod 18. In this way, the rebound spring 38 that is provided inside the cylinder 11 elastically affects the piston rod 18, so as to suppress an excessive extension of the piston rod 18. Note that because the rebound spring 38 provides resistance in this way to the excessive extension of the piston rod 18, it suppresses any lifting of the vehicle wheel 3 on the inner circumferential side when the vehicle in which it is mounted is making a turn, and thereby suppresses the amount of rolling of the vehicle 2.

Here, when the piston rod 18 moves in the protruding direction so that the shock absorbing body 39 shown in FIG. 2 abuts against the rod guide 21, before the piston-side spring bearing 35 causes the rebound spring 38 to contract in length between the piston-side spring bearing 35 and the rod guide-side spring bearing 36, as is described above, as is shown on the left side of the centerline in FIG. 3, the flange portion 56 of the piston rod 18 together with the transmission component 71 squashes the wave spring 72 while resisting the urging force thereof. As a result of this, the transmission component 71 is forced to move slightly in the axial direction towards the flange portion 56 side.

Figure 4:
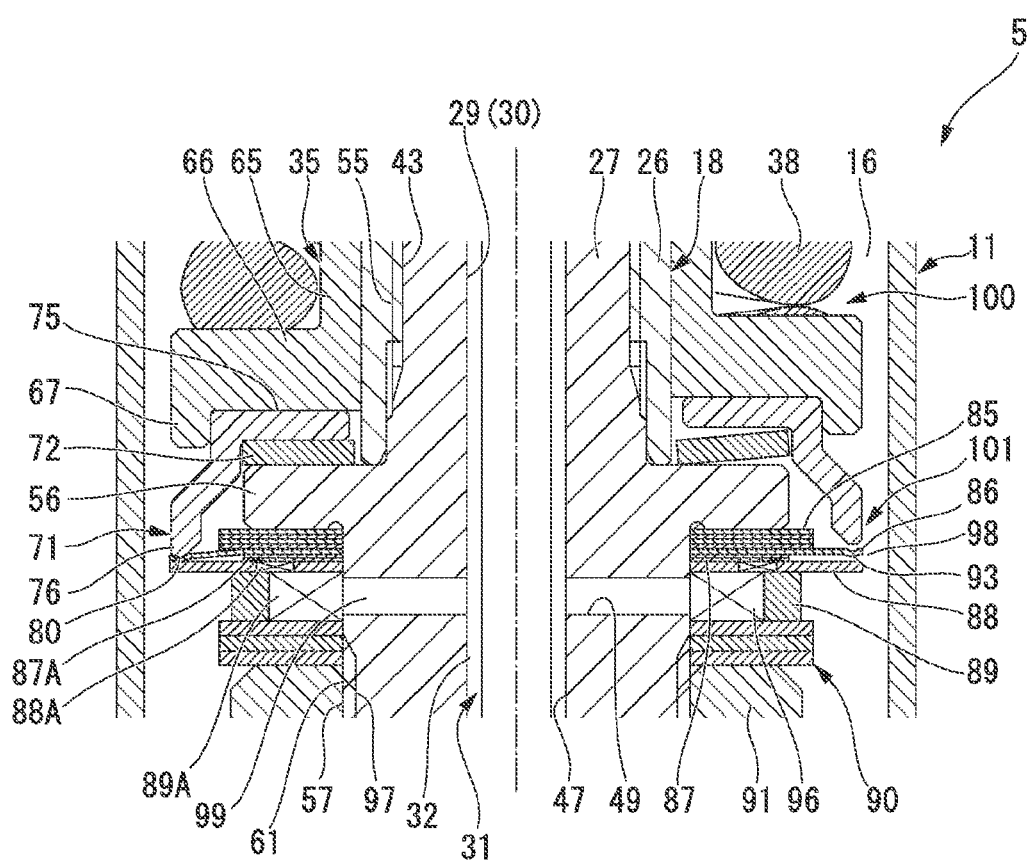
FIG. 4 is a cross-sectional view showing the periphery of one passage area adjustment mechanism of the shock absorber shown in FIG. 2.

As is shown in FIG. 4, a plurality of disks 85, an opening/closing disk 86, a plurality of intermediate disks 87, an abutment disk 88, a passage forming component 89, an interposed portion 90, and a nut 91 are provided in this sequence from the flange portion 56 side on the opposite side in the axial direction from the piston-side spring bearing 35 of the flange portion 56 of the distal end rod 27.

The plurality of disks 85 are each formed in a circular plate shape having a hole in the middle thereof. The plurality of disks 85 has a smaller outer diameter than the inner diameter of the cylindrical portion 76 of the transmission component 71. The opening/closing disk 86 is formed in a circular plate shape having a hole in the middle thereof, and has substantially the same outer diameter as the outer diameter of the cylindrical portion 76 of the transmission component 71. An annular opening/closing portion 93 that is recessed inwards from one surface in the axial direction towards the opposite side in the axial direction, and that protrudes from the other surface in the axial direction towards the opposite side in the axial direction is formed on an outer circumferential side of the opening/closing disk 86.

The opening/closing portion 93 has the same diameter as that of the abutment portion 80 of the transmission component 71.

The plurality of intermediate disks 87 are each formed in a circular plate shape having a hole in the middle thereof. The plurality of intermediate disks 87 has a smaller outer diameter than that of the opening/closing disk 86. Moreover, a plurality of notches 87A is provided on an outer circumferential side of the intermediate disks 87 on the abutment disk 88 side thereof. The abutment disk 88 is formed in a circular plate shape having a hole in the middle thereof, and has the same outer diameter as that of the opening/closing disk 86. A C-shaped through hole 88A is formed in an intermediate portion in the radial direction of the abutment disk 88. The passage forming component 89 is formed in a circular plate shape having a hole in the middle thereof. The passage forming component 89 has a smaller outer diameter than that of the abutment disk 88. A plurality of notches 89A is provided on an inner circumferential side of the passage forming component 89. The interposed portion 90 is formed by a plurality of circular plate-shaped components having a hole in the middle thereof, and has a larger outer diameter than that of the passage forming component 89. A passage 96 that connects an outer side in the radial direction of the intermediate disks 87, namely, the upper chamber 16 to the passage hole 49 is formed in the intermediate disks 87, the abutment disk 88, and the passage forming component 89. The passage 96 is formed by the aforementioned notches 87A that are formed in the outer circumferential portion of the intermediate disks 87, the aforementioned through hole 88A that is formed in an intermediate position in the radial direction of the abutment disk 88, and the aforementioned notches 89A that are formed in the inner circumferential portion of the passage forming component 89.

The above-described plurality of disks 85, the opening/closing disk 86, the plurality of intermediate disks 87, the abutment disk 88, the passage forming component 89, and the interposed portion 90 are placed on the distal end rod 72 such that the holding shaft portion 57 is able to be inserted through the interiors of each of them. In this state, the nut 91 is screwed via the female screw 97 thereof onto the male screw 61. As a result of this, the plurality of disks 85, the opening/closing disk 86, the plurality of intermediate disks 87, the abutment disk 88, the passage forming component 89, and the interposed portion 90 are sandwiched in the axial direction between the flange portion 56 of the distal end rod 27 and the nut 91.

As is shown on the right side of the centerline in FIG. 4, when the transmission component 71 is separated in the axial direction from the flange portion 56 of the distal end rod 27 by the urging force of the wave spring 72, the abutment portion 80 is made to be separated from the opening/closing portion 93 of the opening/closing disk 86. Accordingly, the opening/closing portion 93 is made to be separated from the abutment disk 88. Here, the gap between the opening/closing portion 93 of the opening/closing disk 86 and the abutment disk 88, and the passage 96 in the intermediate disk 87, the abutment disk 88, and the passage forming component 89 form an orifice 98. This orifice 98 together with the passage hole 49 in the distal end rod 27 forms a passage (i.e., the second passage) 99 that connects the upper chamber 16 to the rod internal passage 32.

As is shown on the left side of the centerline in FIG. 4, when the urging force of the rebound spring 38 causes the transmission component 71 to move the base plate portion 75 towards the flange portion 56 side so as to squash the wave spring 72, the abutment portion 80 thereof abuts against the opening/closing portion 93 of the opening/closing disk 86, and causes the opening/closing portion 93 to abut against the abutment disk 88. As a result of this, the orifice 98 is closed, and communication between the upper chamber 16 and the rod internal passage 32 via the passage 99 is blocked.

The transmission component 71, the piston-side spring bearing 35, the rebound spring 38, and the rod guide-side spring bearing 36 and shock absorbing body 39 shown in FIG. 2 form a spring mechanism 100 that is provided inside the cylinder 11 such that one end thereof is able to abut against the opening/closing disk 86 shown in FIG. 4, while the other end thereof is able to abut against the rod guide 21 shown in FIG. 2 that is located at an end portion of the cylinder 11. As is shown in FIG. 4, the spring force of this spring mechanism 100 urges the opening/closing disk 86 in a valve closing direction in resistance to the urging force of the wave spring 72. In addition, this spring mechanism 100 and the opening/closing disk 86 and abutment disk 88 that open and close the orifice 98 form a passage area adjustment mechanism (i.e., a damping force adjustment mechanism) 101 that alters the damping force by adjusting the passage area of the orifice 98, in other words, the passage 99, in accordance with the urging force of the rebound spring 38 which changes in accordance with the position of the piston rod 18. The orifice 98, in other words, the passage area is thus an adjustable orifice.

Figure 5:
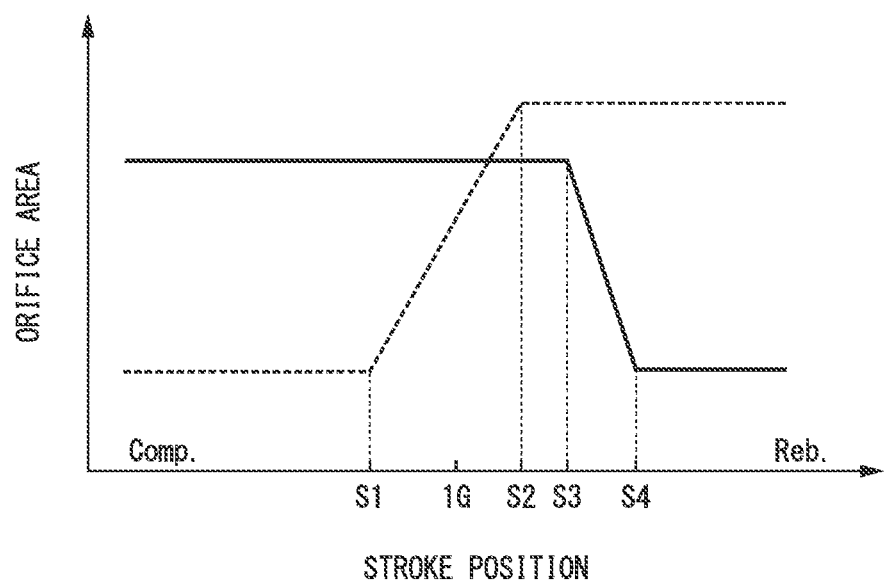
FIG. 5 is a characteristic line diagram showing a relationship between the stroke position of the shock absorber shown in FIG. 2 and the passage area of an orifice.

According to the above-described passage area adjustment mechanism 101, the passage area of the orifice 98 relative to the stroke position of the shock absorber 5 changes as is shown by the solid line in FIG. 5. Namely, over the entire stroke range on the compression side and as far as a predetermined position S3 on the extension side, the passage area of the orifice 98 is a maximum fixed value which includes a neutral position (i.e., a position 1G (a position where the vehicle 2 which has stopped in a horizontal position is supported)). At the predetermined position S3 on the extension side, when the spring mechanism 100 begins to close the opening/closing disk 86 while resisting the urging force from the wave spring 72, the passage area of the orifice 98 becomes proportionately smaller as it moves towards the extension side, and is at the minimum at a predetermined position S4 where the opening/closing portion 93 of the opening/closing disk 86 abuts against the abutment disk 88. Beyond the predetermined position S4 on the extension side, the passage area of the orifice 98 is a minimum fixed value.

As is shown in FIG. 3, the piston 15 is formed by a piston main body 105 which is supported by the distal end rod 27, and by an annular sliding component 106 that is attached to an outer circumferential surface of the piston main body 105 and slides inside the cylinder 11.

A plurality (in FIG. 3, due to the fact that a cross-section is shown, only one location is shown) of passages 111, and a plurality (in FIG. 3, due to the fact that a cross-section is shown, only one location is shown) of passages 112 are provided in the piston main body 105. The passages 111 connect the upper chamber 16 and the lower chamber 17 together such that oil is able to flow between them. When the piston 15 is moving towards the upper chamber 16 side, namely, on an extension stroke of the piston 15, oil flows from the upper chamber 16 through the passages 111 towards the lower chamber 17. The passages 112 connect to the upper chamber 16 and the lower chamber 17 together such that oil is able to flow between them. When the piston 15 is moving towards the lower chamber 17 side, namely in a compression stroke of the piston 15, oil flows from the lower chamber 17 through the passages 112 towards the upper chamber 16. The passages 111 are formed at equal pitches in a circumferential direction such that one passage 112 is sandwiched between respective passages 111. One side in the axial direction of the piston 15 (i.e., the top side in FIG. 3) of the passages 111 opens at the outer side in the radial direction, and the other side (i.e., the bottom side in FIG. 3) thereof opens at the inner side in the radial direction of the piston 15.

In addition, a damping force generating mechanism 114 which generates damping force is provided for half of these passages, namely, the passages 111. The damping force generating mechanism 114 is located on the lower chamber 17 side which is one end side in the axial direction of the piston 15. The passages 111 form an extension-side passage for oil to pass through when the piston 15 moves to the extension side, which is the side where the piston rod 18 extends out from the cylinder 11. The damping force generating mechanism 114 that is provided for these passages 111 forms an extension-side damping force generating mechanism that generates damping force so as to control the flow of oil through the passages 111 that is caused by the movement of the piston 15 towards the extension side.

Moreover, the remaining half of the passages, namely, the passages 112 are formed at equal pitches in the circumferential direction such that one passage 111 is sandwiched between respective passages 112. One side in the axial direction of the piston 15 (i.e., the top side in FIG. 3) of the passages 112 opens at the inner side in the radial direction, and the other side (i.e., the bottom side in FIG. 3) thereof opens at the outer side in the radial direction of the piston 15.

In addition, a damping force generating mechanism 115 which generates damping force is provided for this remaining half of the passages, namely, for the passages 112. The damping force generating mechanism 115 is located on the upper chamber 16 side in the axial direction which is the other end side in the axial direction of the piston 15. The passages 112 form a compression-side passage for oil to pass through when the piston 15 moves to the compression side, which is the side where the piston rod 18 is retracted into the cylinder 11. The damping force generating mechanism 115 that is provided for these passages 112 forms a compression-side damping force generating mechanism that generates damping force so as to control the flow of oil through the passages 112 that is caused by the movement of the piston 15 towards the compression side.

The piston main body 105 is formed in a substantially circular plate shape. A through hole 116 through which the above-described mounting shaft portion 59 of the distal end rod 27 is inserted is formed in the center of the piston main body 105 so as to penetrate this in the axial direction. At an end portion on the lower chamber 17 side of the piston main body 105, a seat portion 117 that forms part of the damping force generating mechanism 114 is formed in an annular shape on the outer side of the position of the apertures at one end of the extension-side passages 111. At an end portion on the upper chamber 16 side of the piston main body 105, a seat portion 118 that forms part of the damping force generating mechanism 115 is formed in an annular shape on the outer side of the position of the apertures at one end of the compression-side passages 112.

The piston main body 105 is formed in a step shape on the opposite side of the seat portion 117 from the through hole 116 such that the height thereof in the axial direction is lower than the seat portion 117. The other ends of the compression-side passages 112 open onto this step-shaped portion. Moreover, in the same way, the piston main body 105 is formed in a step shape on the opposite side of the seat portion 118 from the through hole 116 such that the height thereof in the axial direction is lower than the seat portion 118. The other ends of the extension-side passages 111 open onto this step-shaped portion.

The extension-side damping force generating mechanism 114 is a pressure control type of valve mechanism. The damping force generating mechanism 114 has a plurality of disks 121, a damping valve main body 122, a plurality of disks 123, a seat component 124, a plurality of disks 125, and a valve regulating portion 126 in this sequence from the piston 15 side in the axial direction.

The seat component 124 has a circular plate-shaped base portion 131 having a hole in it that extends in an orthogonal direction relative to the axis, an inner side circular cylinder-shaped portion 132 that is formed in the shape of a circular cylinder that extends in the axial direction on an inner circumferential side of the base portion 131, and an outer side circular cylinder-shaped portion 133 that is formed in the shape of a circular cylinder that extends in the axial direction on an outer circumferential side of the base portion 131. The base portion 131 is offset to one side in the axial direction relative to the inner side circular cylinder-shaped portion 132 and the outer side circular cylinder-shaped portion 133. A plurality of through holes 134 are formed penetrating the base portion 131 in the axial direction. A small diameter hole portion 135 that is used to engage the mounting shaft portion 59 of the distal end rod 27 on the base portion 131 side in the axial direction is formed on the inner side of the inner side circular cylinder-shaped portion 132, and a large diameter hole portion 136, whose hole diameter is larger than that of the small diameter hole portion 135, is formed therein on the opposite side in the axial direction from the base portion 131. An annular seat portion 137 is formed in the outer side circular cylinder-shaped portion 133 of the seat component 124 in an end portion thereof that is located on the base portion 131 side in the axial direction. The plurality of disks 125 are seated in this seat portion 137.

A space on the opposite side in the axial direction from the base portion 131 that is enclosed by the base portion 131, the inner side circular cylinder-shaped portion 132, and the outer side circular cylinder-shaped portion 133 of the seat component 124, and the through holes 134 in the seat component 124 form a pilot chamber (i.e., the second passage) 140 that apply pressure in the direction of the piston 15 to the damping valve main body 122. The aforementioned passage hole 51 in the distal end rod 27, the large diameter hole portion 136 in the seat component 124, and an orifice 151 that is formed in the disks 123 (described below) form a pilot chamber intake passage (i.e., the second passage) 141 that is connected to the rod internal passage 32 and the pilot chamber 140, and that enables oil to be introduced from the upper chamber 16 and the lower chamber 17 via the rod internal passage 32 to the pilot chamber 140.

The plurality of disks 121 are formed in a circular plate shape having a hole in them, and have a smaller outer diameter than the seat portion 117 of the piston 15. The damping valve main body 122 is formed by a circular plate-shaped disk 145 having a hole in it that is able to be seated in the seat portion 117 of the piston 15, and by an annular sealing component 146 that is formed from a rubber material and is adhered to an outer circumferential side of the disk 145 on the opposite side thereof from the piston 15. The damping valve main body 122 and the seat portion 117 of the piston 15 form an extension-side damping valve 147 that is provided between the passages 111 that are provided in the piston 15 and the pilot chamber 140 that is provided in the seat component 124, and that forms an extension-side damping valve 147 that generates damping force so as to control the flow of oil that is caused by the movement of the piston 15 towards the extension side. Accordingly, this damping valve 147 is a disk valve. Note that, apart from the hole in the center thereof through which the mounting shaft portion 59 of the piston rod 18 is inserted, there is no other portion where the disk 145 is penetrated in the axial direction.

The sealing component 146 of the damping valve main body 122 is in contact with an inner circumferential surface of the outer side circular cylinder-shaped portion 133 of the seat component 124, and seals the gap between the damping valve main body 122 and the outer side circular cylinder-shaped portion 133. Accordingly, the above-described pilot chamber 140 located between the damping valve main body 122 and the seat component 124 causes internal pressure to be applied to the damping valve main body 122 in the direction of the piston 15, namely, in a valve-closing direction in which it comes into contact with the seat portion 117. The damping valve 147 is a pilot type of damping valve which has the pilot chamber 140. When the damping valve main body 122 opens up by becoming unseated from the seat portion 117 of the piston 15, oil from the passages 111 flows into the lower chamber 17 via a passage 148 that extends in the radial direction between the piston 15 and the seat component 124.

The plurality of disks 123 are formed in a circular plate shape having a hole in them, and have a diameter that is smaller than that of the disk 145. An orifice 151 in the form of an aperture portion is formed in the particular disk 123 from among the plurality of disks 123 that is located on the seat component 124 side. As is described above, the interior of the large diameter hole portion 136 of the seat component 124 and the pilot chamber 140 are connected together by means of this orifice 151.

The plurality of disks 125 are formed in a circular plate shape having a hole in them, and are able to be seated in the seat portion 137 of the seat component 124. The plurality of disks 125 and the seat portion 137 form a disk valve 153 which is a damping valve that is provided in the seat component 124 and controls the flow of oil between the pilot chamber 140 and the lower chamber 17. An orifice 154 in the form of an aperture portion that, even when it is in contact with the seat portion 137, allows the pilot chamber 140 to communicate with the lower chamber 17 is formed in the particular disk 125 from among the plurality of disks 125 that is located on the seat portion 137 side. The disk valve 153 enables the pilot chamber 140 to be in communication with the lower chamber 17 by means of a broader passage area than the orifice 154 by unseating the plurality of disks 125 from the seat portion 137. The valve regulating portion 126 is formed by a plurality of annular components. The valve regulating portion 126 abuts against the plurality of disks 125 so as to regulate any transformation thereof in the opening direction other than that stipulated.

In the same way as the damping force generating mechanism on the extension side, the compression-side damping force generating mechanism 115 is also a pressure control type of valve mechanism. The compression-side damping force generating mechanism 115 has a plurality of disks 181, a damping valve main body 182, a plurality of disks 183, a seat component 184, a plurality of disks 185, and a valve regulating portion 186 in this sequence from the piston 15 side in the axial direction.

The seat component 184 has a circular plate-shaped base portion 191 having a hole in it that extends in an orthogonal direction relative to the axis, an inner side circular cylinder-shaped portion 192 that is formed in the shape of a circular cylinder that extends in the axial direction on an inner circumferential side of the base portion 191, and an outer side circular cylinder-shaped portion 193 that is formed in the shape of a circular cylinder that extends in the axial direction on an outer circumferential side of the base portion 191. The base portion 191 is offset to one side in the axial direction relative to the inner side circular cylinder-shaped portion 192 and the outer side circular cylinder-shaped portion 193. A plurality of through holes 194 are formed penetrating the base portion 191 in the axial direction. A small diameter hole portion 195 that is used to engage the mounting shaft portion 59 of the distal end rod 27 on the base portion 191 side in the axial direction is formed on the inner side of the inner side circular cylinder-shaped portion 192, and a large diameter hole portion 196, whose hole diameter is larger than that of the small diameter hole portion 195, is formed therein on the opposite side from the base portion 191 in the axial direction. An annular seat portion 197 is formed in the outer side circular cylinder-shaped portion 193 in an end portion thereof that is located on the base portion 191 side in the axial direction. The plurality of disks 185 are seated in this seat portion 197.

A space on the opposite side from the base portion 191 that is enclosed by the base portion 191, the inner side circular cylinder-shaped portion 192, and the outer side circular cylinder-shaped portion 193 of the seat component 184, and the through holes 194 form a pilot chamber (i.e., the second passage) 200 that apply pressure in the direction of the piston 15 to the damping valve main body 182. The aforementioned passage hole 50 in the distal end rod 27, the large diameter hole portion 196 in the seat component 184, and an orifice 211 that is formed in the disks 183 (described below) form a pilot chamber intake passage (i.e., the second passage) 201 that is connected to the rod internal passage 32 and the pilot chamber 200, and that enables oil to be introduced from the upper chamber 16 and the lower chamber 17 via the rod internal passage 32 to the pilot chamber 200.

The plurality of disks 181 are formed in a circular plate shape having a hole in them, and have a smaller outer diameter than the seat portion 118 of the piston 15. The damping valve main body 182 is formed by a circular plate-shaped disk 205 having a hole in it that is able to be seated in the seat portion 118 of the piston 15, and by an annular sealing component 206 that is formed from a rubber material and is adhered to an outer circumferential side of the disk 205 on the opposite side thereof from the piston 15. The damping valve main body 182 and the seat portion 118 of the piston 15 form a compression-side damping valve 207 that is provided between the passages 112 that are provided in the piston 15 and the pilot chamber 200 that is provided in the seat component 184, and that generates damping force so as to control the flow of oil that is caused by the movement of the piston 15 towards the compression side. Accordingly, this damping valve 207 is a disk valve. Note that, apart from the hole in the center thereof through which the mounting shaft portion 59 of the piston rod 18 is inserted, there is no other portion where the disk 205 is penetrated in the axial direction.

The sealing component 206 is in contact with an inner circumferential surface of the outer side circular cylinder-shaped portion 193 of the seat component 184, and seals the gap between the damping valve main body 182 and the outer side circular cylinder-shaped portion 193 of the seat component 184. Accordingly, the above-described pilot chamber 200 located between the damping valve main body 182 and the seat component 184 causes internal pressure to be applied to the damping valve main body 182 of the damping valve 207 in the direction of the piston 15, namely, in a valve-closing direction in which it comes into contact with the seat portion 118. The damping valve 207 is a pilot type of damping valve which has the pilot chamber 200. When the damping valve main body 182 opens up by becoming unseated from the seat portion 118 of the piston 15, oil from the passages 112 flows into the upper chamber 16 via a passage 208 that extends in the radial direction between the piston 15 and the seat component 184.

The plurality of disks 183 are formed in a circular plate shape having a hole in them, and have a diameter that is smaller than that of the disk 205. An orifice 211 in the form of an aperture portion is formed in the particular disk 183 from among the plurality of disks 183 that is located on the seat component 184 side. As is described above, the interior of the large diameter hole portion 196 of the seat component 184 and the pilot chamber 200 are connected together by means of this orifice 211.

The plurality of disks 185 are formed in a circular plate shape having a hole in them, and are able to be seated in the seat portion 197 of the seat component 184. The plurality of disks 185 and the seat portion 197 form a disk valve 213 which is a damping valve that controls the flow of oil between the pilot chamber 200, which is provided in the seat component 184, and the upper chamber 16. An orifice 214 in the form of an aperture portion that, even when it is in contact with the seat portion 197, allows the pilot chamber 200 to communicate with the upper chamber 16 is formed in the particular disk 185 from among the plurality of disks 185 that is located on the seat portion 197 side. The disk valve 213 enables the pilot chamber 200 to be in communication with the upper chamber 16 by means of a broader passage area than that provided by the orifice 214 by unseating the plurality of disks 185 from the seat portion 197. The valve regulating portion 186 is formed by a plurality of annular components. The valve regulating portion 186 abuts against the plurality of disks 185 so as to regulate any transformation thereof in the opening direction other than that stipulated.

A nut 220 is screwed onto the male screw 62 at the distal end of the distal end rod 27. A female screw 221 into which the male screw 62 is screwed is formed on an inner circumferential portion of the nut 220, and the nut 220 also has a main body portion 222 on an outer circumferential portion thereof that a fastening tool such as a wrench or the like is able to engage with, and an inner flange portion 223 that extends inwards in the radial direction from one end side in the axial direction of the main body portion 222.

The nut 220 is screwed onto the distal end rod 27 with the opposite side thereof from the inner flange portion 223 of the main body portion 222 on the valve regulating portion 126 side. When the nut 220 is fastened, the inner circumferential side of each one of the valve regulating portion 126, the plurality of disks 125, the seat component 124, the plurality of disks 123, the damping valve main body 122, the plurality of disks 121, the piston 15, the plurality of disks 181, the damping valve main body 182, the plurality of disks 183, the seat component 184, the plurality of disks 185, and the valve regulating portion 186 is held between the nut 220 and a step surface 225 on the mounting shaft portion 59 side of the intermediate shaft portion 58 of the distal end rod 27.

As is shown in FIG. 2, the metering pin 31 has a supporting flange portion 230 that is supported by the base valve 23, a large diameter shaft portion 232 that has a smaller diameter than the supporting flange portion 230 and that extends in the axial direction from the supporting flange portion 230, a tapered shaft portion 233 that extends in the axial direction from the opposite side from the supporting flange portion 230 of the large diameter shaft portion 232, and a small diameter shaft portion 234 that extends in the axial direction from the opposite side from the large diameter shaft portion 232 of the tapered shaft portion 233. The diameter of the large diameter portion 232 is constant. As is shown in FIG. 3, the diameter of the small diameter shaft portion 234 is a constant diameter that is smaller than that of the large diameter shaft portion 232. The tapered shaft portion 233 is continuous with an end portion on the small diameter shaft portion 234 side of the large diameter shaft portion 232, and is continuous with an end portion on the large diameter shaft portion 232 side of the small diameter shaft portion 234, and tapers down to a smaller diameter the closer it gets to the small diameter shaft portion 234 so as to connect together the small diameter shaft portion 234 and the large diameter shaft portion 232.

The metering pin 31 is inserted inside the inner flange portion 223 inside the nut 220, and through the insertion hole 30 that is formed by the through hole 29 and the insertion hole 28 in the piston rod 18. The metering pin 31 forms the rod internal passage 32 between the metering pin 31 itself and the piston rod 18. The gap between the inner flange portion 223 of the nut 220 and the metering pin 31 forms an orifice (i.e., the second passage) 235 that enables the rod internal passage 32 to communicate with the lower chamber 17. When the position in the axial direction of the large diameter shaft portion 232 is matched to that of the inner flange portion 223, the passage area of this orifice 235 is at its smallest, so that the circulation of oil is essentially restricted. Moreover, when the position in the axial direction of the small diameter shaft portion 234 is matched to that of the inner flange portion 223, the passage area of the orifice 235 is at its widest so that the circulation of oil is permitted. Furthermore, the orifice 235 is also constructed such that, when the position in the axial direction of the tapered shaft portion 233 is matched to that of the inner flange portion 223, the passage area of the orifice 235 becomes gradually wider as it moves closer to the small diameter shaft portion 234 side. Because the nut 220 moves integrally with the piston rod 18, the inner flange portion 223 inside the nut 220 and the metering pin 31 form a passage area adjustment mechanism (i.e., a damping force adjustment mechanism) 236 that alters the damping force by adjusting the passage area of the orifice 235. The orifice 235 is a variable orifice whose passage area changes in accordance with the position of the piston rod 18. In other words, the passage area adjustment mechanism 236 adjusts the passage area of the orifice 235 by means of the metering pin 31.

The rod internal passage 32, the passage 99, and the orifice 235 connect the upper chamber 16 to the lower chamber 17 via the passage area adjustment mechanisms 101 and 236 such that oil is able to flow between them. The passage area adjustment mechanism 101 that adjusts the passage area using the position of the piston rod 18 is provided in the passage 99, while the passage area adjustment mechanism 236 that adjusts the passage area using the position of the piston rod 18 is provided in the orifice 235.

The passage area of the orifice 235 relative to the stroke position of the shock absorber 5, which is adjusted by the aforementioned passage area adjustment mechanism 236, changes in the manner shown by the broken line in FIG. 5. Namely, further to the compression side than a compression-side predetermined position S1, the position in the axial direction of the inner flange portion 223 is matched to that of the large diameter shaft portion 232, so that the passage area of the orifice 235 is a minimum constant value. Furthermore, from the predetermined position S1 and extending across a neutral position to an extension-side predetermined position S2, the position in the axial direction of the inner flange portion 223 is matched to that of the tapered shaft portion 233, so that the passage area of the orifice 235 becomes proportionately greater as it moves towards the extension side. Further to the extension side of this predetermined position S2, the position in the axial direction of the inner flange portion 223 is matched to that of the small diameter shaft portion 234, so that the passage area of the orifice 235 becomes a maximum constant value.

As is shown in FIG. 2, the above-described base valve 23 is provided between the base portion of the outer cylinder 12 and the cylinder 11. This base valve 23 has a substantially circular plate-shaped base valve component 241 that forms a partition between the lower chamber 17 and the reservoir chamber 13, a disk 242 that is provided on a lower side of the base valve component 241, namely, that is provided on the reservoir chamber 13 side, a disk 243 that is provided on an upper side of the base valve component 241, namely, that is provided on the lower chamber 17 side, a mounting pin 244 that mounts the disk 242 and the disk 243 onto the base valve component 241, an engaging component 245 that is attached to an outer circumferential side of the base valve component 241, and a supporting plate 246 that supports the supporting flange portion 230 of the metering pin 31. The mounting pin 244 sandwiches a central portion in the radial direction of the disk 242 and the disk 243 between itself and the base valve component 241.

A pin insertion hole 248 through which the mounting pin 244 is inserted is formed in the center in the radial direction of the base valve component 241. A plurality of passage holes 249 that enable oil to circulate between the lower chamber 17 and the reservoir chamber 13 are formed on the outer side of this pin insertion hole 248. A plurality of passage holes 250 that enable oil to circulate between the lower chamber 17 and the reservoir chamber 13 are formed on the outer side of these passage holes 249. The disk 242 on the reservoir chamber 13 side permits the flow of oil from the lower chamber 17 via the inner side passage holes 249 to the reservoir chamber 13, and it restricts the flow of oil from the reservoir chamber 13 via the inner side passage holes 249 to the lower chamber 17. The disk 243 permits the flow of oil from the reservoir chamber 13 via the outer side passage holes 250 to the lower chamber 17, and it restricts the flow of oil from the lower chamber 17 via the outer side passage holes 250 to the reservoir chamber 13.

The disk 242 and the base valve component 241 form a compression-side damping valve 252 that opens on the compression stroke so as to allow oil to flow from the lower chamber 17 to the reservoir chamber 13, and that also generates damping force. The disk 243 and the base valve component 241 form a suction valve 253 that opens on the extension stroke so as to allow oil to flow from the reservoir chamber 13 to the lower chamber 17. Note that, because of the relationship between the suction valve 253 and the compression-side damping force generating mechanism 115 that is provided in the piston 15, the suction valve 253 fulfills the function of allowing liquid to flow from the lower chamber 17 to the reservoir chamber 13 essentially without generating any damping force so that any excess liquid generated mainly by the entry of the piston rod 18 into the cylinder 11 is discharged.

The engaging component 245 has a cylindrical shape, and the base valve component 241 is engaged with an internal side thereof. The base valve component 241 is fitted together with an inner circumferential portion of the bottom end of the cylinder 11 via this engaging component 245. An engaging flange portion 255 that extends inwards in the radial direction is formed on an end portion on the piston 15 side of the engaging component 245. Outer circumferential portions of the supporting plate 246 are engaged with the opposite side of the engaging flange portion 255 from the piston 15 side, while inner circumferential portions thereof are engaged with the piston 15 side of the supporting flange portion 230 of the metering pin 31. As a result, the engaging component 245 and the supporting plate 246 hold the supporting flange portion 230 of the metering pin 31 up against the mounting pin 244.

Figure 6:
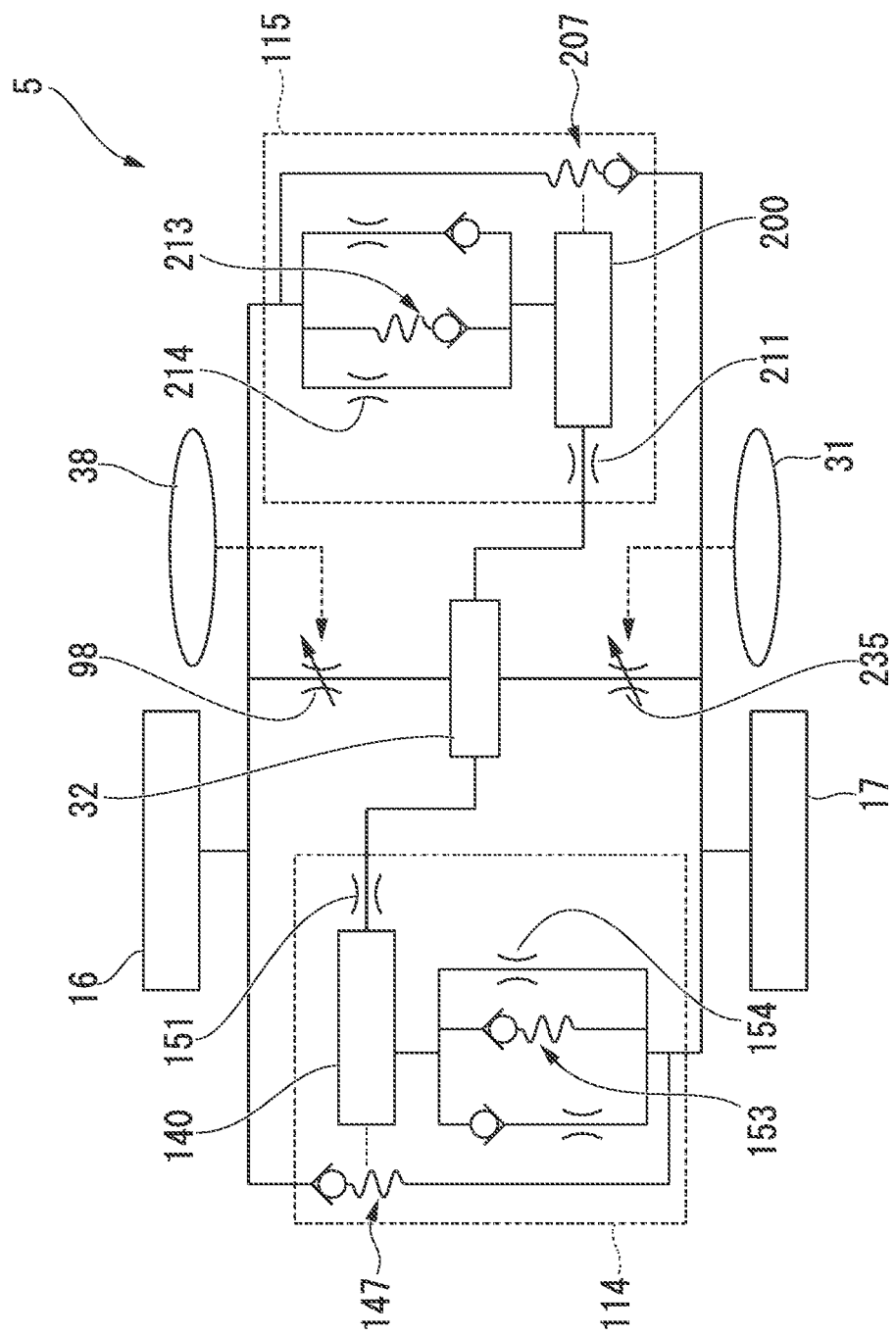
FIG. 6 is a hydraulic circuit diagram of the shock absorber shown in FIG. 2.

A hydraulic circuit diagram of the shock absorber 5 having the above-described structure is shown in FIG. 6. Namely, the extension-side damping force generating mechanism 114 and the compression-side damping force generating mechanism 115 are provided in parallel with each other between the upper chamber 16 and the lower chamber 17. The rod internal passage 32 is in communication with the upper chamber 16 via the orifice 98 that is controlled by the rebound spring 38, and is in communication with the lower chamber 17 via the orifice 235 that is controlled by the metering pin 31. In addition, the pilot chamber 140 of the extension-side damping force generating mechanism 114 is in communication with the rod internal passage 32 via the orifice 151. The pilot chamber 200 of the compression-side damping force generating mechanism 115 is in communication with the rod internal passage 32 via the orifice 211.

In the shock absorber 5, within a maximum length-side predetermined range where the piston rod 18 extends further to the outside of the cylinder 11 than a maximum length-side predetermined position (i.e., a first predetermined position), the shock absorbing body 39 abuts against the rod guide 21, and the length of the spring mechanism 100, which includes the rebound spring 38, is compressed in length. As a result, as is shown on the left side of the centerline in both FIG. 3 and FIG. 4, the passage area adjustment mechanism 101 squashes the wave spring 72 by means of the transmission component 71 of the spring mechanism 100 so as to press the opening/closing disk 86 against the abutment disk 88, and thereby cause the passage 99 to be blocked. Moreover, within this maximum length-side predetermined range, the passage area adjustment mechanism 236 matches the inner flange portion 223 with the position in the axial direction of the small diameter shaft portion 234 of the metering pin 31, so as to change the passage area of the orifice 235 to its maximum width. Within this maximum length-side predetermined range, the rod internal passage 32 is in communication with the lower chamber 17 via the above-described orifice 235, and the pilot chamber 140 of the extension-side damping force generating mechanism 114 and the pilot chamber 200 of the compression-side damping force generating mechanism 115 are both in communication with the lower chamber 17 via the orifice 235, the rod internal passage 32, and the pilot chamber intake passages 141 and 201.

Within this maximum length-side predetermined range, on the extension stroke when the piston rod 18 extends to the outside of the cylinder 11, the piston 15 moves towards the upper chamber 16 side, and the pressure inside the upper chamber 16 increases while the pressure inside the lower chamber 17 decreases. As a consequence of this, the pressure inside the upper chamber 16 acts, via the extension-side passages 111 that are formed in the piston 15, on the damping valve main body 122 of the damping valve 147 of the extension-side damping force generating mechanism 114. At this time, because the pilot chamber 140, which causes pilot pressure to be applied to the damping valve main body 122 in the direction of the seat portion 117, is in communication with the lower chamber 17 via the orifice 235, the rod internal passage 32, and the pilot chamber intake passage 141, it is placed in a pressure state close to that of the lower chamber 17, and the pilot pressure decreases. Accordingly, the differential pressure acting on the damping valve main body 122 increases, so that the damping valve main body 122 is able to move away comparatively easily from the seat portion 117 and open up, and thereby allow oil to flow to the lower chamber 17 side via the passage 148 that extends in the radial direction between the piston 15 and the seat component 124. As a result of this, the damping pressure decreases. Namely, the extension-side damping force changes to a soft state.

Moreover, within this maximum length-side predetermined range, on the compression stroke when the piston rod 18 is retracted inside the cylinder 11, the piston 15 moves towards the lower chamber 17 side, and the pressure inside the lower chamber 17 increases while the pressure inside the upper chamber 16 decreases. As a consequence of this, the pressure inside the lower chamber 17 acts, via the compression-side passages 112 that are formed in the piston 15, on the damping valve main body 182 of the damping valve 207 of the compression-side damping force generating mechanism 115. At this time, the pilot chamber 200, which causes pilot pressure to be applied to the damping valve main body 182 in the direction of the seat portion 118, is in communication with the lower chamber 17 via the orifice 235, the rod internal passage 32, and the pilot chamber intake passage 201. Because of this, the pilot chamber 200 is placed in a pressure state close to that of the lower chamber 17, and not only does the pressure inside the lower chamber 17 increase but the pilot pressure also increases.

In this state, when the piston speed is slow, because the increase in pressure in the pilot chamber 200 is able to follow the increase in pressure in the lower chamber 17, the differential pressure received by the damping valve main body 182 decreases, so that it becomes difficult for the damping valve main body 182 to move away from the seat portion 118. Accordingly, oil from the lower chamber 17 passes through the pilot chamber 200 from the orifice 235, the rod internal passage 32, and the pilot chamber intake passage 201, and flows into the upper chamber 16 via the orifice 214 in the plurality of disks 185 of the disk valve 213, so that damping force is generated from the orifice characteristics (i.e., the damping force is substantially proportional to the square of the piston speed). Because of this, the characteristics of the damping force relative to the piston speed change such that the rate of the increase in the damping force becomes comparatively higher relative to the increase in the piston speed.

Moreover, even when the piston speed is faster than that described above, it is difficult for the damping valve main body 182 to separate from the seat portion 118, so that oil from the lower chamber 17 passes through the pilot chamber 200 from the orifice 235, the rod internal passage 32, and the pilot chamber intake passage 201 and, while the plurality of disks 185 of the disk valve 213 are open, passes between the seat portion 197 and the plurality of disks 185, and then flows into the upper chamber 16. As a consequence, damping force is generated from the valve characteristics (i.e., the damping force is substantially proportional to the piston speed). Because of this, the characteristics of the damping force relative to the piston speed change such that the rate of the increase in the damping force becomes slightly lower relative to the increase in the piston speed.

As a result of the above, the damping force during the compression stroke is higher compared to the damping force during the extension stroke, and the compression-side damping force is in a hard state.

Note that even if the piston is on the compression stroke within the maximum length-side predetermined range, if impact shocks are being generated as a result of bumps and the like on the road surface, then if the piston speed enters an even higher speed region, the pressure increase in the pilot chamber 200 is not able to follow the pressure increase in the lower chamber 17. Because of this, the relationship between the forces generated by the pressure difference that is acting on the damping valve main body 182 of the damping valve 207 of the compression-side damping force generating mechanism 115 becomes one in which the force in an opening direction that is applied from the passages 112 formed in the piston 15 is greater than the force in a closing direction that is applied from the pilot chamber 200. Accordingly, in this higher speed region, as the piston speed increases, the damping valve 207 opens up and the damping valve main body 182 moves away from the seat portion 118. As a result, in addition to the flow towards the upper chamber 16 through the space between the seat portion 197 of the disk valve 213 and the plurality of disks 185, oil also flows to the upper chamber 16 via the passage 208 that extends in the radial direction between the piston 15 and the seat component 184. As a consequence of this, the increase in the damping force is suppressed. Looking at the characteristics of the damping force relative to the piston speed at this time, there is almost no rate of increase in the damping force relative to the increase in the piston speed. Accordingly, when the piston is operating at high speed and also impact shocks having a comparatively high-frequency that are caused by bumps in the road surface and the like are being generated, as is described above, by suppressing any increase in the damping force relative to the increase in the piston speed, these shocks can be adequately absorbed.

Figure 7:
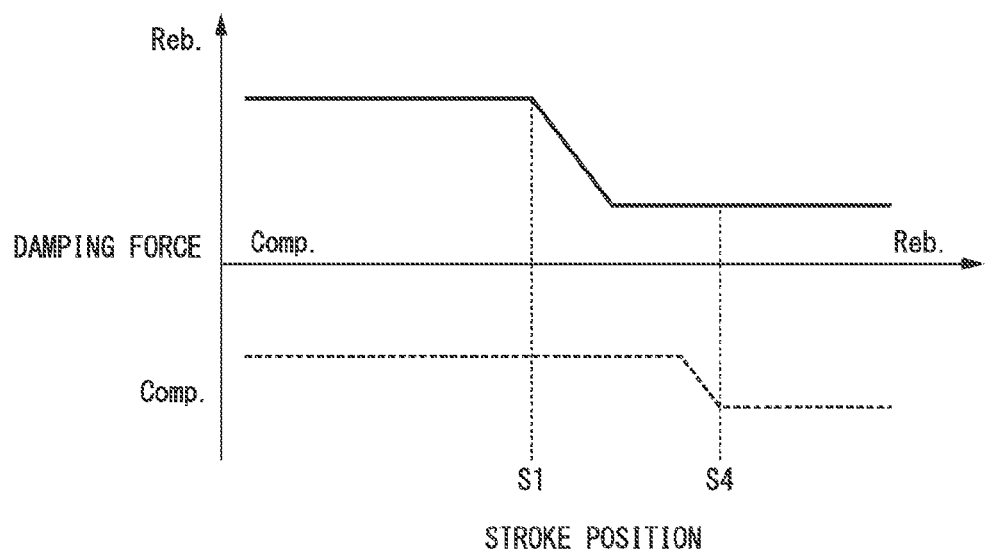
FIG. 7 is a characteristic line diagram showing a relationship between the stroke position of the shock absorber shown in FIG. 2 and the damping force.
Figure 8:
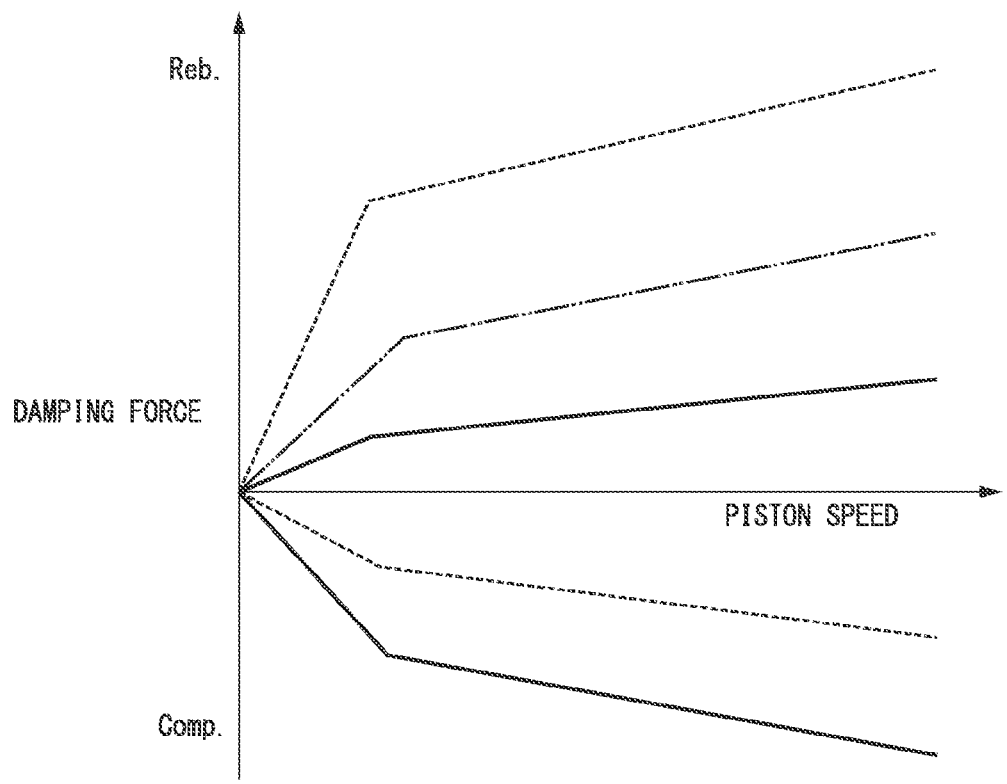
FIG. 8 is a characteristic line diagram showing a relationship between the piston speed of the shock absorber shown in FIG. 2 and the damping force.

The maximum length-side predetermined range which is where, as is described above, the piston rod 18 extends further outwards from the cylinder 11 than a maximum length-side predetermined position is the extension-side range (i.e., on the right side in FIG. 7) of a position S4 shown in FIG. 7, and the maximum length-side characteristics (i.e., first characteristics) are such that, as is shown by the solid line in FIG. 7, the extension-side damping force is in a soft state while, as is shown by the broken line in FIG. 7, the compression-side damping force is in a hard state. As is shown by the solid line in FIG. 8, irrespective of whether the piston is operating at high speed or at low speed, the maximum length-side characteristics are such that the extension-side damping force is in a soft state and the compression-side damping force is in a hard state.

In contrast, within a minimum length-side predetermined range where the piston rod 18 is retracted inside the cylinder 11 beyond a minimum length-side predetermined position (i.e., a second predetermined position), the rebound spring 38 is not compressed, and as is shown on the right side of the centerline in both FIG. 3 in FIG. 4, the passage area adjustment mechanism 101 changes the passage area of the orifice 98 of the passage 99 to its maximum by moving the opening/closing disk 86 away from the abutment disk 88 without being pressed by the spring mechanism 100 which includes the rebound spring 38. Moreover, in the minimum length-side predetermined range, the passage area adjustment mechanism 236 matches the internal flange portion 223 to the position in the axial direction of the large diameter shaft portion 232 of the metering pin 31, and thereby blocks off the orifice 235. In this minimum length-side predetermined range, the rod internal passage 32 is in communication with the upper chamber 16 via the above-described passage 99, and the pilot chamber 140 of the extension-side damping force generating mechanism 114 and the pilot chamber 200 of the compression-side damping force generating mechanism 115 are both in communication with the upper chamber 16 via the rod internal passage 32.

Within this minimum length-side predetermined range, on the extension stroke when the piston rod 18 extends to the outside of the cylinder 11, the piston 15 moves towards the upper chamber 16 side, and the pressure inside the upper chamber 16 increases while the pressure inside the lower chamber 17 decreases. As a consequence of this, the pressure inside the upper chamber 16 acts, via the extension-side passages 111 that are formed in the piston 15, on the damping valve main body 122 of the damping valve 147 of the extension-side damping force generating mechanism 114. At this time, the pilot chamber 140, which causes pilot pressure to be applied to the damping valve main body 122 in the direction of the seat portion 117, is in communication with the upper chamber 16 via the passage 99, the rod internal passage 32, and the pilot chamber intake passage 141. Because of this, the pilot chamber 140 is placed in a pressure state close to that of the upper chamber 16, and not only does the pressure inside the upper chamber 16 increase but the pilot pressure also increases.

In this state, when the piston speed is slow, because the increase in pressure in the pilot chamber 140 is able to follow the increase in pressure in the upper chamber 16, the differential pressure received by the damping valve main body 122 decreases, so that it becomes difficult for the damping valve main body 122 to move away from the seat portion 117. Accordingly, oil from the upper chamber 16 passes through the pilot chamber 140 from the passage 99, the rod internal passage 32, and the pilot chamber intake passage 141, and flows into the lower chamber 17 via the orifice 154 in the plurality of disks 125 of the disk valve 153, so that damping force is generated from the orifice characteristics (i.e., the damping force is substantially proportional to the square of the piston speed). Because of this, the characteristics of the damping force relative to the piston speed change such that the rate of the increase in the damping force becomes comparatively higher relative to the increase in the piston speed.

Moreover, even when the piston speed is faster than that described above, the damping valve main body 122 does not move away from the seat portion 117. Oil from the upper chamber 16 passes through the pilot chamber 140 from the passage 99, the rod internal passage 32, and the pilot chamber intake passage 141, and, while the plurality of disks 125 of the disk valve 153 are open, passes between the seat portion 137 and the plurality of disks 125, and then flows into the lower chamber 17. As a consequence, damping force is generated from the valve characteristics (i.e., the damping force is substantially proportional to the piston speed). Because of this, the characteristics of the damping force relative to the piston speed change such that the rate of the increase in the damping force becomes slightly lower relative to the increase in the piston speed.

As a result of the above, the damping force during the extension stroke is higher, and the extension-side damping force is in a hard state.

Moreover, within this minimum side-length predetermined range, on the compression stroke when the piston rod 18 is retracted inside the cylinder 11, the piston 15 moves towards the lower chamber 17 side such that the pressure inside the lower chamber 17 increases and the pressure inside the upper chamber 16 decreases. As a consequence of this, the pressure inside the lower chamber 17 acts, via the compression-side passages 112 that are formed in the piston 15, on the damping valve main body 182 of the damping valve 207 of the compression-side damping force generating mechanism 115. At this time, because the pilot chamber 200, which causes pilot pressure to be applied to the damping valve main body 182 in the direction of the seat portion 118, is in communication with the upper chamber 16 via the passage 99, the rod internal passage 32, and the pilot chamber intake passage 201, it is placed in a pressure state close to that of the upper chamber 16, and the pilot pressure decreases. Accordingly, the differential pressure acting on the damping valve main body 182 increases, so that the damping valve main body 182 is able to move away comparatively easily from the seat portion 118 and open up, and thereby allow oil to flow to the upper chamber 16 side via the passage 208 that extends in the radial direction between the piston 15 and the seat component 184.

As a result of this, the damping pressure on the compression stroke is less in comparison to the damping pressure on the extension stroke, so that the compression-side damping force changes to a soft state.

The minimum length-side predetermined range, which is where, as is described above, the piston rod 18 is retracted inside the cylinder 11 beyond a minimum length-side predetermined position, is the compression-side range (i.e., on the left side in FIG. 7) of the position S1 shown in FIG. 7, and the minimum length-side characteristics (i.e., second characteristics) are such that, as is shown by the solid line in FIG. 7, the extension-side damping force is in a hard state while, as is shown by the broken line in FIG. 7, the compression-side damping force is in a soft state. As is shown by the broken line in FIG. 8, irrespective of whether the piston is operating at high speed or at low speed, the minimum length-side characteristics are such that the extension-side damping force is in a hard state and the compression-side damping force is in a soft state. Moreover, when the piston rod 18 is, for example, in a neutral position, as is shown by the double-dot chain line for the extension side, and by the broken line for the compression side in FIG. 8, irrespective of whether the piston is operating at high speed or at low speed, the extension-side damping force is in a medium state, while the compression-side damping force is in a soft state.

One of the above-described shock absorbers 5 is provided for each one of the four wheels. The shock absorbers 5 that are provided in this manner each have the above-described position-sensitive damping force change characteristics.

As is shown in FIGS. 9A through 9D, the cylinder device 6 has a cylinder 501 inside which oil is sealed so as to serve as a working fluid, a piston 504 that fits inside the cylinder 501 such that it is able to slide inside it, and that separates the interior of the cylinder 501 into an upper chamber 502 and a lower chamber 503, and the piston rod 505 that is joined to the piston 504, and that extends to the outside of the cylinder 501. The side of the cylinder device 6 that is on the opposite side from the side towards which the piston rod 505 of the cylindrical 501 extends is joined to the vehicle body 2 shown in FIG. 1, while the portion thereof that extends out from the cylinder 501 of the piston rod 505 is joined to the vehicle wheel 3.

One of the above-described cylinder devices 6 is provided separately from the shock absorber 5 for each of the 4 wheels. As is shown in FIGS. 9A through 9D, four cylinder devices 6 (FL), 6 (FR), 6 (RL), and 6 (RR) are mutually linked to each other so as to form an operating force adjustment mechanism 500.

The operating force adjustment mechanism 500 has a tube 506 (F) that connects together an upper chamber 502 of the cylinder device 6 (FL) that is provided on the left front wheel and a lower chamber 503 of the cylinder device 6 (FR) that is provided on the right front wheel, and a tube 507 (F) that connects together a lower chamber 503 of the cylinder device 6 (FL) and an upper chamber 502 of the cylinder device 6 (FR). The operating force adjustment mechanism 500 also has a tube 506 (R) that connects together the upper chamber 502 of the cylinder device 6 (RL) that is provided on the left rear wheel and the lower chamber 503 of the cylinder device 6 (RR) that is provided on the right rear wheel, and a tube 507 (R) that connects together the lower chamber 503 of the cylinder device 6 (RL) and the upper chamber 502 of the cylinder device 6 (RR).

In addition, the operating force adjustment mechanism 500 also has a tube 508 that connects together the tube 506 (F) and the tube 506 (R), a tube 509 that connects together the tube 507 (F) and the tube 507 (R), an accumulator 510 that is provided in the tube 508, and an accumulator 511 that is provided in the tube 509. The operating force adjustment mechanism 500 forms a hydraulic closed-circuit that requires no external energy.

Figure 9A:
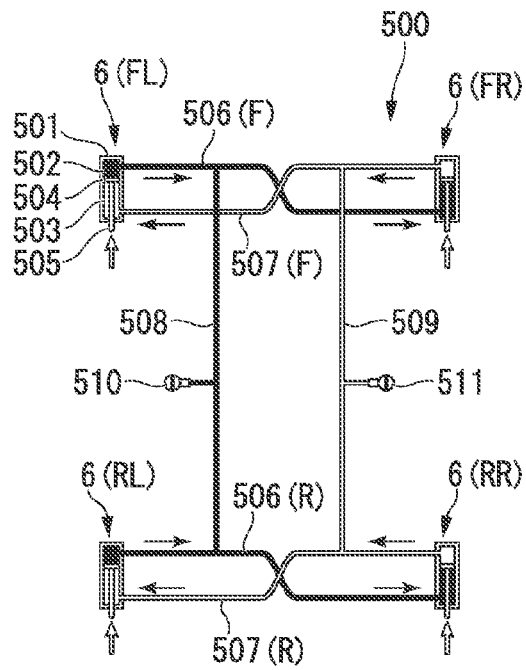
FIG. 9A is a hydraulic circuit diagram showing an operating force adjustment mechanism that forms part of the suspension device according to the first embodiment of the present invention, and shows a state when the vehicle is bouncing.

When a vehicle in which the above-described operating force adjustment mechanism 500 is installed bounces, as is shown in FIG. 9A, the operating force adjustment mechanism 500 changes to a state in which, on the left and right front wheel side, as a result of the cylinder device 6 (FL) being compressed, the piston 504 moves between the upper chamber 502 and the lower chamber 503 thereof in a direction that causes the upper chamber 502 to contract and causes the lower chamber 503 to expand. Moreover, as a result of the cylinder device 6 (FR) being compressed, the piston 504 moves between the upper chamber 502 and the lower chamber 503 thereof in a direction that causes the upper chamber 502 to contract and causes the lower chamber 503 to expand. At this time, because the upper chamber 502 of the cylinder device 6 (FL) and the lower chamber 503 of the cylinder device 6 (FR) are in communication with each other via the tube 506 (F), and the lower chamber 503 of the cylinder 6 (FL) and the upper chamber 502 of the cylinder device 6 (FR) are in communication with each other via the tube 507 (F), the oil that is discharged from the upper chamber 502 of the cylinder device 6 (FL) by the aforementioned movement of the piston 504 is introduced into the lower chamber 503 of the cylinder device 6 (FR), and the oil that is discharged from the upper chamber 502 of the cylinder device 6 (FR) by this movement of the cylinder 504 is introduced into the lower chamber 503 of the cylinder device 6 (FL).

On the left and right rear wheel side as well, as a result of the cylinder device 6 (RL) being compressed, the piston 504 moves between the upper chamber 502 and the lower chamber 503 thereof in a direction that causes the upper chamber 502 to contract and causes the lower chamber 503 to expand. Moreover, as a result of the cylinder device 6 (RR) being compressed, the piston 504 moves between the upper chamber 502 and the lower chamber 503 thereof in a direction that causes the upper chamber 502 to contract and causes the lower chamber 503 to expand. At this time, because the upper chamber 502 of the cylinder device 6 (RL) and the lower chamber 503 of the cylinder device 6 (RR) are in communication with each other via the tube 506 (R), and the lower chamber 503 of the cylinder 6 (RL) and the upper chamber 502 of the cylinder device 6 (RR) are in communication with each other via the tube 507 (R), the oil that is discharged from the upper chamber 502 of the cylinder device 6 (RL) by the aforementioned movement of the piston 504 is introduced into the lower chamber 503 of the cylinder device 6 (RR), and the oil that is discharged from the upper chamber 502 of the cylinder device 6 (RR) by this movement of the cylinder 504 is introduced into the lower chamber 503 of the cylinder device 6 (RL).

In this manner, if a vehicle bounces on the road such that there is a common phase input from the road surface into the left and right front wheels, and a common phase input from the road surface into the left and right rear wheels, and such that the left and right cylinder devices 6 (FL) and 6 (FR) operate at the same phase, and the left and right cylinder devices 6 (RL) and 6 (RR) also operate at the same phase, then oil is only able to move back and forth between the left and right cylinder devices 6 (FL) and 6 (FR), and back and forth between the left and right cylinder devices 6 (RL) and 6 (RR), and there is no movement of oil into or out of the accumulators 510 and 511. Accordingly, no reaction force is generated in the lower chamber 503 on the side into which oil from the cylinder devices 6 (FL), 6 (FR), 6 (FL), and 6 (FR) enters, or in the upper chamber 502 on the side from which this oil exits, and the cylinder devices 6 (FL), 6 (FR), 6 (FL), and 6 (FR) do not generate any operating force between the vehicle body 2 and vehicle wheel 3. Accordingly, fundamentally, the operating force provided by the shock absorber 5 is achieved between the vehicle body 2 and the vehicle wheel 3.

Figure 9B:
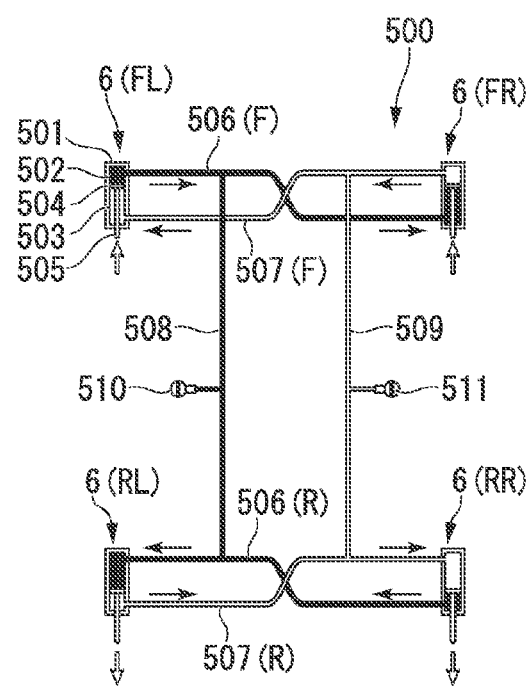
FIG. 9B is a hydraulic circuit diagram showing an operating force adjustment mechanism that forms part of the suspension device according to the first embodiment of the present invention, and shows a state when the vehicle is pitching.

Moreover, when the vehicle pitches, as is shown in FIG. 9B, the operating force adjustment mechanism 500 changes to a state in which, while the cylinder devices 6 (FL) and 6 (FR) on the left and right front wheel side perform in the same way as during the above-described bounce, on the left and right rear wheel side, as a result of the cylinder device 6 (RL) extending, the piston 504 moves between the lower chamber 503 and the upper chamber 502 thereof in a direction that causes the lower chamber 503 to contract and causes the upper chamber 502 to expand. Moreover, as a result of the cylinder device 6 (RR) extending, the piston 504 moves between the lower chamber 503 and the upper chamber 502 thereof in a direction that causes the lower chamber 503 to contract and causes the upper chamber 502 to expand. At this time as well, the oil that is discharged from the lower chamber 503 of the cylinder device 6 (RL) is introduced through the tube 507 (R) into the upper chamber 502 of the cylinder device 6 (RR), and the oil that is discharged from the lower chamber 503 of the cylinder device 6 (RR) is introduced through the tube 506 (R) into the upper chamber 502 of the cylinder device 6 (RL).

In this manner, if a vehicle pitches such that there is a common phase input from the road surface into the left and right front wheels, and a common phase input from the road surface into the left and right rear wheels, and such that the left and right cylinder devices 6 (FL) and 6 (FR) operate at the same phase, and the left and right cylinder devices 6 (RL) and 6 (RR) also operate at the same phase, then oil is only able to move back and forth between the left and right cylinder devices 6 (FL) and 6 (FR), and back and forth between the left and right cylinder devices 6 (RL) and 6 (RR), and there is no movement of oil into or out of the accumulators 510 and 511. Accordingly, the cylinder devices 6 (FL), 6 (FR), 6 (RL), and 6 (RR) do not generate any operating force between the vehicle body 2 and vehicle wheel 3. Accordingly, the operating force between the vehicle body 2 and the vehicle wheel 3 is fundamentally adjusted by the shock absorbers 5 provided in each of the four wheels.

Figure 9C:
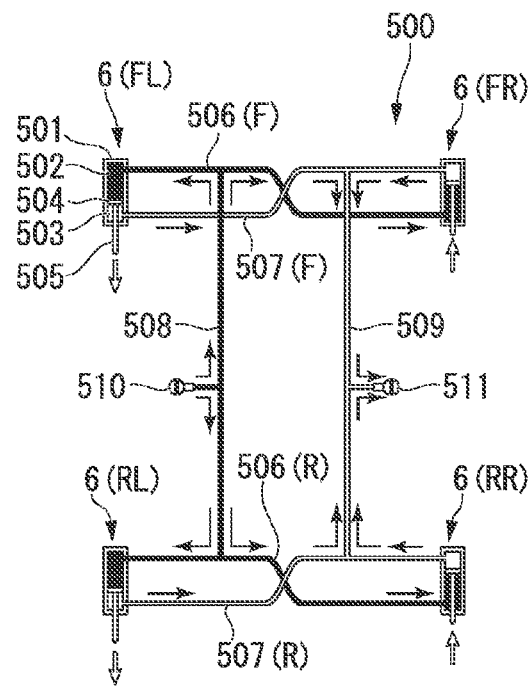
FIG. 9C is a hydraulic circuit diagram showing an operating force adjustment mechanism that forms part of the suspension device according to the first embodiment of the present invention, and shows a state when the vehicle is rolling.
Figure 9D:
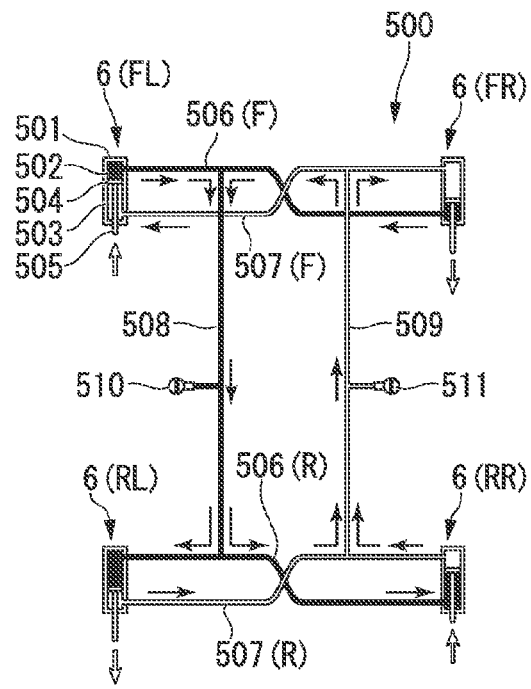
FIG. 9D is a hydraulic circuit diagram showing an operating force adjustment mechanism that forms part of the suspension device according to the first embodiment of the present invention, and shows a state when the vehicle is rolling in opposite directions between the front and rear.

Moreover, when the vehicle rolls, there is a common phase input from the road surface into the left front and rear wheels, and a common phase input from the road surface into the right front and rear wheels and, as is shown in FIG. 9C, the operating force adjustment mechanism 500 changes to a state in which, on the left and right front wheel side, for example, as a result of the cylinder device 6 (FL) extending, the piston 504 moves between the lower chamber 503 and the upper chamber 502 thereof in a direction that causes the lower chamber 503 to contract and causes the upper chamber 502 to expand. In contrast, as a result of the cylinder device 6 (FR) being compressed, the piston 504 moves between the upper chamber 502 and the lower chamber 503 thereof in a direction that causes the upper chamber 502 to contract and causes the lower chamber 503 to expand. Moreover, on the left and right rear wheel side as well, as a result of the cylinder device 6 (RL) extending, the piston 504 moves between the lower chamber 503 and the upper chamber 502 thereof in a direction that causes the lower chamber 503 to contract and causes the upper chamber 502 to expand. In contrast, as a result of the cylinder device 6 (RR) being compressed, the piston 504 moves between the upper chamber 502 and the lower chamber 503 thereof in a direction that causes the upper chamber 502 to contract and causes the lower chamber 503 to expand.

At this time, because the upper chamber 502 of the cylinder device 6 (FL) and the lower chamber 503 of the cylinder device 6 (FR) that both expand are in communication with each other via the tube 506 (F), and the upper chamber 502 of the cylinder 6 (RL) and the lower chamber 503 of the cylinder device 6 (RR) that both expand are in communication with each other via the tube 506 (R), and the tubes 506 (F) and 506 (R) are in communication with each other via the tube 508, insufficient oil is discharged from the accumulator 510. Moreover, because the lower chamber 503 of the cylinder device 6 (FL) and the upper chamber 502 of the cylinder device 6 (FR) that both contract are in communication with each other via the tube 507 (F), and the lower chamber 503 of the cylinder 6 (RL) and the upper chamber 502 of the cylinder device 6 (RR) that both contract are in communication with each other via the tube 507 (R), and the tubes 507 (F) and 507 (R) are in communication with each other via the tube 509, the discharged oil is introduced into the accumulator 511 because the accumulators 510 and 511 have a structure that restricts the circulation of oil, resistance force is generated in the operations of each one of the cylinder devices 6 (FL), 6 (FR), 6 (RL), and 6 (RR). Using this, the operating force adjustment mechanism 500 adjusts the operating force in the roll direction between the vehicle body 2 and the vehicle wheel 3. Specifically, the operating force adjustment mechanism 500 adjusts the operating force such that roll rigidity is increased in order to suppress any roll that is generated by the acceleration of the vehicle body 2 in a horizontal direction.

Furthermore, if vehicle is rolling in opposite directions between the front and rear, the operating force adjustment mechanism 500 changes to a state in which, on the left and right front wheel side, for example, as a result of the cylinder device 6 (FL) being compressed, the piston 504 moves between the upper chamber 502 and the lower chamber 503 thereof in a direction that causes the upper chamber 502 to contract and causes the lower chamber 503 to expand. In contrast, as a result of the cylinder device 6 (FR) extending, the piston 504 moves between the lower chamber 503 and the upper chamber 502 thereof in a direction that causes the lower chamber 503 to contract and causes the upper chamber 502 to expand. Moreover, on the left and right rear wheel side, conversely, as a result of the cylinder device 6 (RL) extending, the piston 504 moves between the lower chamber 503 and the upper chamber 502 thereof in a direction that causes the lower chamber 503 to contract and causes the upper chamber 502 to expand. In contrast, as a result of the cylinder device 6 (RR) being compressed, the piston 504 moves between the upper chamber 502 and the lower chamber 503 thereof in a direction that causes the upper chamber 502 to contract and causes the lower chamber 503 to expand.

At this time, because the lower chamber 503 of the cylinder device 6 (FL) and the upper chamber 502 of the cylinder device 6 (FR) that both expand are in communication with each other via the tube 507 (F), and the lower chamber 503 of the cylinder 6 (RL) and the upper chamber 502 of the cylinder device 6 (RR) that both contract are in communication with each other via the tube 507 (R), and the tubes 507 (F) and 507 (R) are in communication with each other via the tube 509, oil is able to move back and forth between the front cylinder devices 6 (FL) and 6 (FR) and the rear cylinder device 6 (RL) and the rear cylinder device 6 (RR). Moreover, because the upper chamber 502 of the cylinder device 6 (FL) and the lower chamber 503 of the cylinder device 6 (FR) that both contract are in communication with each other via the tube 506 (F), and the upper chamber 502 of the cylinder 6 (RL) and the lower chamber 503 of the cylinder device 6 (RR) that both expand are in communication with each other via the tube 506 (R), and the tubes 506 (F) and 506 (R) are in communication with each other via the tube 508, oil is able to move back and forth between the front cylinder devices 6 (FL) and 6 (FR) and the rear cylinder device 6 (RL) and the rear cylinder device 6 (RR). Accordingly, there is no movement of oil into or out of the accumulators 510 and 511, and the cylinder devices 6 (FL), 6 (FR), 6 (RL), and 6 (RR) of the operating force adjustment mechanism 500 do not generate any operating force between the vehicle body 2 and vehicle wheel 3. Accordingly, the operating force between the vehicle body 2 and the vehicle wheel 3 is fundamentally adjusted by the shock absorbers 5 provided in each of the four wheels.

The shock absorbers described in the aforementioned Patent documents 1 and 2 are position-sensitive shock absorbers, however, from the standpoint of improving the riding comfort of the vehicle and improving handling stability, there is still room for improvement even when this type of shock absorber is used.

Figures 10, 11:
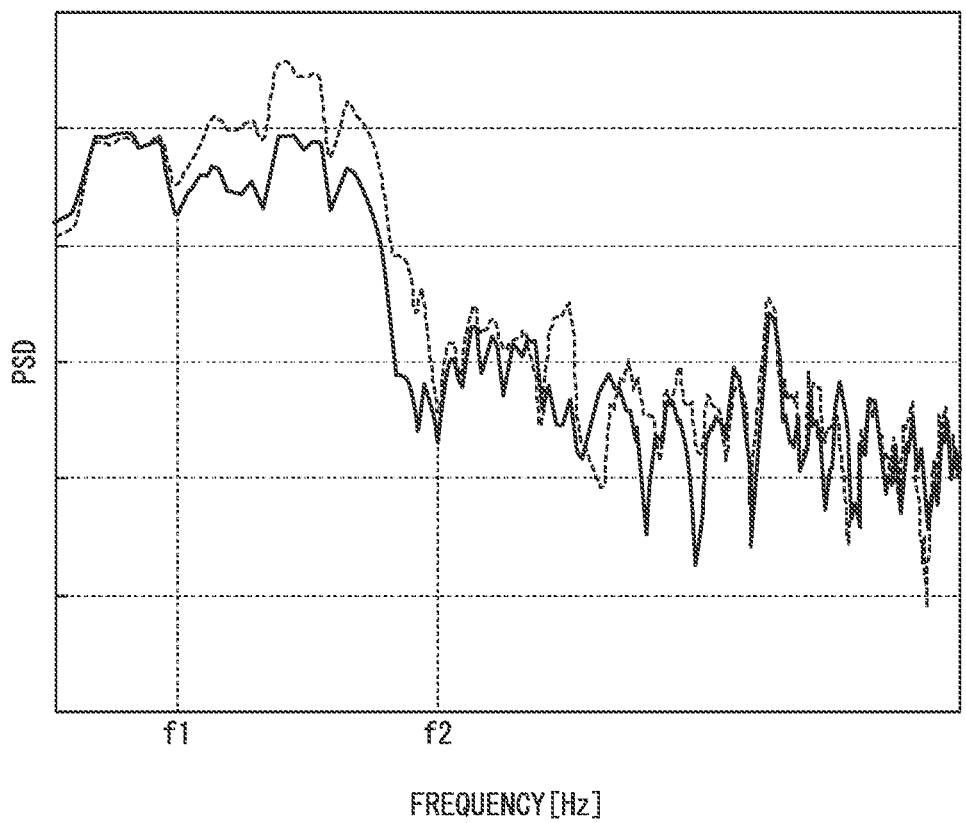
FIG. 10 is a table showing a summary of the characteristics of the shock absorber shown in FIG. 2.
FIG. 11 is a characteristic line diagram showing a relationship between a frequency and an unsprung mass acceleration when a vehicle in which the suspension device according to the first embodiment of the present invention has been mounted is traveling along a bumpy road

The above-described suspension device 1 according to the first embodiment makes it possible to obtain, in the shock absorber 5 of each one of a vehicle's four wheels, maximum length-side characteristics in which, in a maximum length-side predetermined range, which is where the piston rod 18 extends outwards from the cylinder 11 beyond a maximum length-side predetermined position, the extension-side damping force is in a soft state and the compression-side damping force is in a hard state, and to obtain minimum length-side characteristics in which, in a minimum length-side predetermined range, which is where the piston rod 18 is retracted inside the cylinder 11 beyond a minimum length-side predetermined position, the extension-side damping force is in a hard state and the compression-side damping force is in a soft state. Because of this, the riding comfort of a vehicle in which this suspension device 1 is mounted is superb even on a variety of road surfaces (in particular, rough road surfaces). Namely, because the above-described maximum length-side characteristics and minimum length—side characteristics are obtained from the shock absorber 5, it is possible to reduce (in other words, soften) the vibration force that is applied to a spring, and increase (in other words, harden) the damping force that is applied to a spring, and to obtain high-quality riding comfort such as that provided by skyhook control without electronic control being performed. The above-described characteristics of the position-sensitive shock absorber 5 are tabulated in FIG. 10. FIG. 11 shows the unsprung mass acceleration in order to illustrate the effects on riding comfort when a vehicle in which this suspension device is mounted is driven over a rough road surface. According to the shock absorber 5 of the first embodiment which does not have a position-sensitive function in the broken line shown in FIG. 11 and does have a position-sensitive function in the solid line shown in FIG. 11, it can be seen that particularly in the frequency range from f1 to f2, the unsprung mass acceleration is reduced. This shows that the action on the spring decreases, and the riding comfort is improved.

Figure 12:
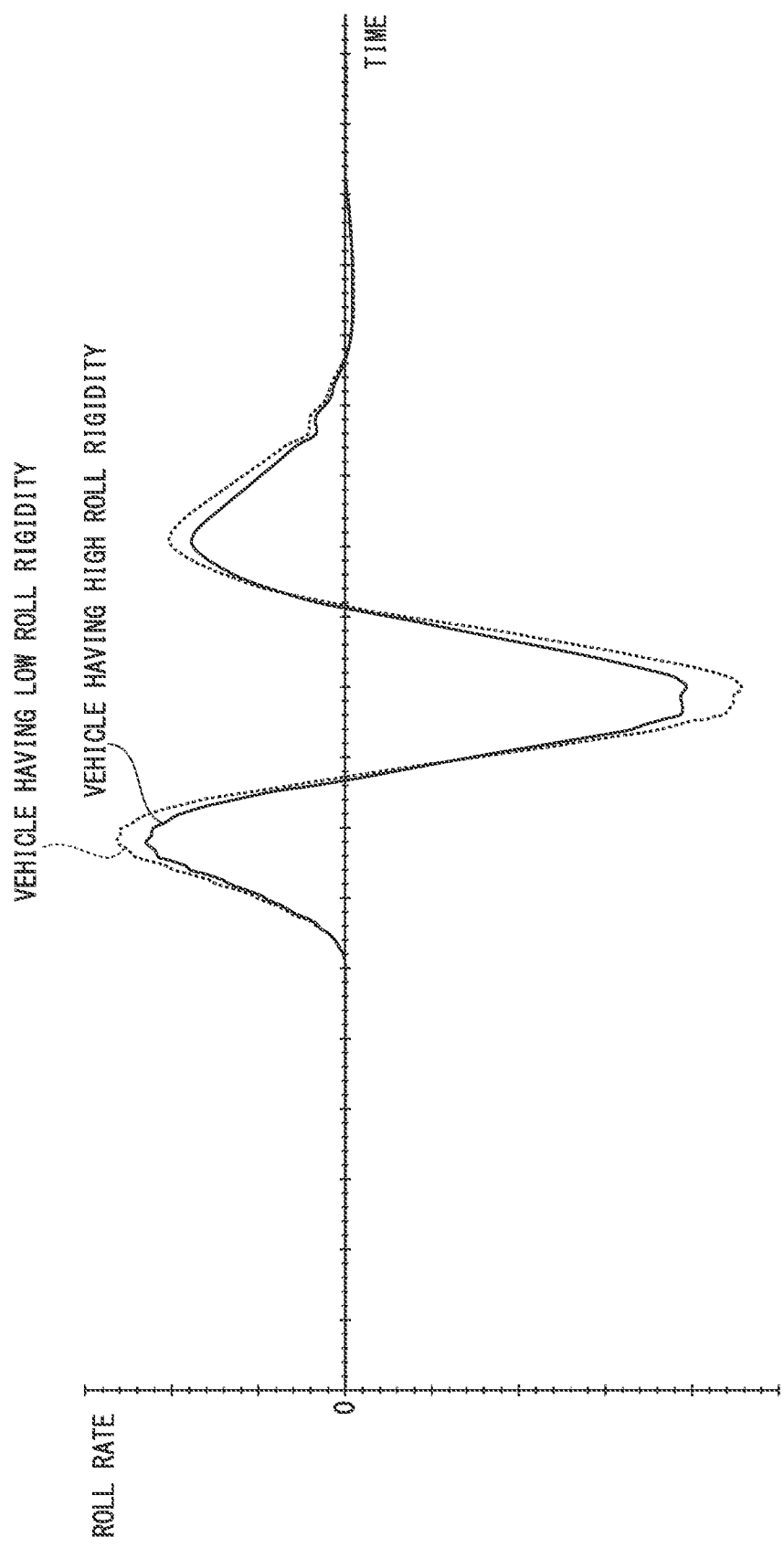
FIG. 12 shows results of a simulation of the roll rate when a vehicle in which the suspension device according to the first embodiment of the present invention has been mounted performs a lane change while traveling at 60 km per hour.

In the position-sensitive shock absorber 5, on the maximum length-side predetermined range, the extension-side damping force is in a soft state, while on the minimum length-side predetermined range, the compression-side damping force is in a soft state. Because of this, when, for example, a vehicle is entering a corner on a good road surface, acceleration is generated in the vehicle 2 in a horizontal direction so that rolling is also generated, and if there is a front-rear same phase, small amplitude input from the road surface, the operating force suppressing the roll is weakened. In contrast to this, the suspension device 1 of the first embodiment is provided with a separate operating force adjustment mechanism 500 that is able to adjust the operating force in the roll direction of the vehicle body 2. Because this operating force adjustment mechanism 500 adjusts the roll rigidity such that the rolling of the vehicle body 2 is suppressed, this rolling can be limited. Accordingly, it is possible to improve handling stability. For example, as is shown in FIG. 12, when a vehicle in which the operating force adjustment mechanism 500 is mounted makes a lane change while traveling at 60 km/h, a vehicle in which the operating force adjustment mechanism 500 is provided and that has high roll rigidity (shown by the solid line in FIG. 12) has a smaller roll rate than a vehicle in which no operating force adjustment mechanism is provided and that has low roll rigidity (shown by the broken line in FIG. 12). In this way, if the roll rate is reduced, then the roll sensation can also be suppressed and handling stability can be improved. Note that when the aforementioned bouncing occurs such as when, for example, the vehicle is traveling over a corrugated road surface or the like, because there is a left-right same phase, large amplitude input from the road surface, as is described above, the operating force adjustment mechanism 500 does not generate operating force. Accordingly, there is no obstruction to improving the riding comfort from the position-sensitive shock absorber 5. Moreover, even when the vehicle is rolling in opposite directions between the front and rear, as is described above, the operating force adjustment mechanism 500 does not generate operating force. Accordingly, there is no obstruction to improving the riding comfort from the position-sensitive shock absorber 5.

As is described above, it is possible by means of the suspension device 1 to achieve an improvement in the riding comfort of the vehicle in which it is mounted and an improvement in handling stability. Moreover, because the suspension device 1 is formed by the mechanical operating force adjustment mechanism 500, which is not an electronically controlled component, but is the same as the mechanical shock absorber 5, it is low in cost and long-lived, and has far fewer breakages.

Moreover, because the position-sensitive shock absorber 5 and the operating force adjustment mechanism 500 which is able to adjust the operating force in a roll direction are used in combination, together these are able to decrease any unnecessary action by the springs in the vehicle in which they are mounted, and are thereby able to improve the durability of the vehicle. In addition to this, because the frequency at which the shock absorber 5 extends and contracts is greatly reduced, the product quality of the shock absorber 5 can also be improved.

Moreover, the shock absorbers described in the aforementioned Patent documents 1 and 2 are position-sensitive shock absorbers. Position-sensitive shock absorbers raise the valve opening pressure by directly applying the spring loading from a spring to a disk valve that opens and closes the passage formed in a piston. Because of this, in a position-sensitive shock absorber, in order to be able to adjust the damping force between an extension-side position and a compression-side position, both an extension-side spring and a compression-side spring are required. Moreover, in order to increase the variable width of the damping force, it is necessary to raise the spring rate, however, if the spring rate is raised then the action from the spring reaction force also increases and not only are abrupt changes generated in the damping force, but the stroke of the piston rod 18 is also shortened so that the riding comfort of the vehicle deteriorates. Moreover, it is not possible to apply settings that increase the variable width of the damping force at the same time as they reduce the reaction force, so that the problem arises that it is not possible to freely design the characteristics of the shock absorber.

In contrast to this, according to the above-described first embodiment, in the shock absorber 5 of each one of a vehicle's four wheels, using the passage area adjustment mechanism 101 that adjusts the passage area of the orifice 98 by means of the position of the piston rod 18, and using the passage area adjustment mechanism 236 that adjusts the passage area of the orifice 235 by means of the position of the piston rod 18, it is possible to obtain maximum length-side characteristics in which, in a maximum length-side predetermined range, which is where the piston rod 18 extends further outwards from the cylinder 11 than a maximum length-side predetermined position, the extension-side damping force is in a soft state and the compression-side damping force is in a hard state, and to obtain minimum length-side characteristics in which, in a minimum length-side predetermined range, which is where the piston rod 18 is retracted inside the cylinder 11 beyond a minimum length-side predetermined position, the extension-side damping force is in a hard state and the compression-side damping force is in a soft state. Because the passage area of the orifices 98 and 235 through which oil circulates are adjusted in this manner, it is possible to smoothly change the damping force, and to improve even further the riding comfort of a vehicle in which the present invention is mounted Moreover, at the design stage as well, the shock absorber 5 is able to adjust the damping force characteristics while making substantially no changes to the reaction force characteristics simply by changing the characteristics of the opening/closing disk 86 and changing the area of the notches 87A in the intermediate disks 87 in the passage area adjustment mechanism 101 without altering the spring rate of the rebound spring 38. Moreover, by changing the profile of the metering pin 31 in the passage area adjustment mechanism 236, it is possible to change the damping force characteristics without changing the reaction force characteristics. As a consequence of this, there is an improved degree of design freedom, and it is possible for the damping characteristics to be easily tuned. Each of the respective embodiments described below has the same effects.

Moreover, in the shock absorber 5, the passage 99, the rod internal passage 32, the pilot chamber intake passage 141, the pilot chamber intake passage 201, and the orifice 235 are connected together by the pilot chamber 140 of the damping valve 147, which is provided in the extension-side passages 111, and by the pilot chamber 200 of the damping valve 207, which is provided in the compression-side passages 112. Because of this, the valve opening pressures of the damping valves 147 and 207 are adjusted by adjusting the pilot pressures in the pilot chambers 140 and 200 of the damping valves 147 and 207 using the passage area adjustment mechanisms 101 and 236. In other words, the passage area adjustment mechanisms adjust the valve opening pressures of the damping valves 147 and 207 in response to the position of the piston rod 18. Accordingly, it is possible for the damping pressure to be changed even more smoothly.

Furthermore, because the passage area adjustment mechanism 236 adjusts the orifice 235 by means of the metering pin 31, the shock absorber 5 is able to stably adjust the passage area in accordance with the position of the piston rod 18. Accordingly, it is possible for stable damping force characteristics to be obtained.

Moreover, because the passage area adjustment mechanism 101 urges the opening/closing disk 86 in a valve closing direction using the spring force of the spring mechanism 100 that is provided inside the cylinder 11 and whose one end is able to abut against the opening/closing disk 86 which opens and closes the passage 99, and whose other end is able to abut against the cylinder 11 end portion side of the rod guide 21, the spring mechanism 100 that urges the opening/closing disk 86 in the valve closing direction is able to double as a mechanism to restrict the extension movement of the piston rod 18.

Note that the diameter of the metering pin 31 is not limited to the two diameters provided by the large diameter shaft portion 232 and the small diameter shaft portion 234, and may be formed into three or more diameters. For example, if a fixed-diameter intermediate diameter shaft portion that has a smaller diameter than the large diameter shaft portion 232 and has a larger diameter than the small diameter shaft portion 234 is provided between the large diameter shaft portion 232 and the small diameter shaft portion 234, then when the piston rod 18 is located in an intermediate predetermined range between the maximum length-side predetermined position and the minimum length-side predetermined position, the following characteristics are obtained.

When the piston rod 18 is in the intermediate predetermined range, in the same way as for the minimum length-side predetermined range, the passage area adjustment mechanism 101 sets the passage area of the passage 99 to its maximum by moving the abutment disk 88 away from the opening/closing disk 86 without applying any pressure thereto using the spring mechanism 100. In spite of this, the passage area adjustment mechanism 236 sets the passage area of the orifice 235 to a wider area than the minimum length-side predetermined range by matching the inner flange portion 223 to the position in the axial direction of the intermediate diameter shaft portion of the metering pin 31. In this intermediate predetermined range, the pressures in the pilot chamber 140 and the pilot chamber 200 are closer to the pressure in the lower chamber 17 than when the passage area of the orifice 235 is in the minimum length-side predetermined range.

Accordingly, on the extension stroke, the pressure inside the pilot chamber 140 is lower than for the minimum length-side predetermined range. Because of this, the differential pressure received by the damping valve main body 122 of the damping valve 147 of the extension-side damping force generating mechanism 114 is larger than for the minimum length-side predetermined range, and is in a medium state that is lower than the hard state when the damping force is in the minimum length-side predetermined range, but higher than the soft state when the damping force is in the maximum length-side predetermined range. In contrast, on the compression stroke, because the passage area adjustment mechanism 101 sets the passage area of the passage 99 to its maximum, in the same way as in the minimum length-side predetermined range, the damping force is low and is in a soft state.

In this way, by reducing the rate of change in the intermediate predetermined range, namely, in the range of the position 1G, it is possible to reduce the rate of change in the damping force that is caused by the weight of the vehicle which changes depending on the number of people riding in the vehicle or on the load carried by the vehicle.

Note that as the operating force adjustment mechanism 500 that is capable of adjusting the operating force in the roll direction of the vehicle, it is possible to use an operating force adjustment mechanism that changes the spring constant of a suspension spring, or one in which the damping force of the shock absorber can be changed by means of electronic control such as a semi-active suspension or an active suspension, or one in which the rigidity of the stabilizers can be changed. If, for example, priority is to be given to the cost aspect, there may be cases when it is preferable to use an operating force adjustment mechanism in which the rigidity of the stabilizers can be changed. Operating force adjustment mechanisms that allow the rigidity of the stabilizers to be changed include hydraulic passive systems, hydraulic active systems, and electric active systems. For example, the stabilizer device disclosed in Japanese Patent Application No. 2003-80916, and the stabilizer device disclosed in Japanese Patent Application No. 2011-31734 can be used.

Second Embodiment

Figure 13:
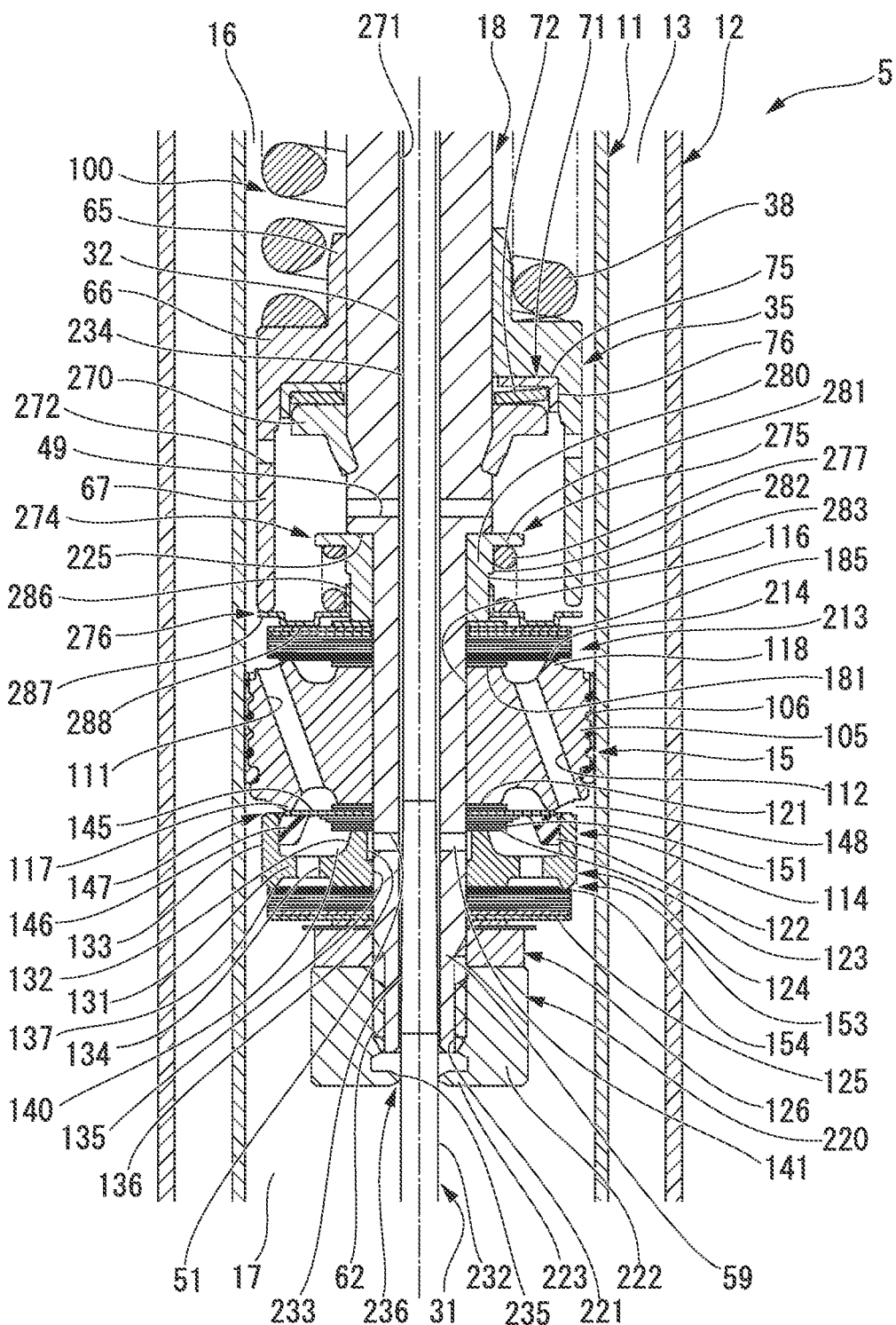
FIG. 13 is a cross-sectional view showing principal portions of a shock absorber that forms part of a suspension device according to a second embodiment of the present invention.

Next, a second embodiment will be described concentrating on portions thereof that are different from the first embodiment based mainly on FIG. 13 and FIG. 14. Note that the same designations and the same symbols are used to express portions that are the same as in the first embodiment.

In the second embodiment, the shock absorber 5 that is used is different from that of the first embodiment. In the shock absorber 5 of the second embodiment, firstly, a portion of the piston rod 18 is different. This piston rod 18 is not divided as are the rod main body 26 and the distal end rod 27 of the first embodiment. Moreover, the flange portion 56 of the first embodiment is not formed on the outer circumferential side thereof, but instead, a separate flange component 270 is attached by crimping. Furthermore, an insertion hole 271 that, together with the metering pin 31 forms the rod internal passage 32, is formed having a constant diameter, and the through holes 49 and 51 communicate with the insertion hole 271. Note that the passage hole 50 of the first embodiment is not formed.

Moreover, the cylindrical portion 76 of the transmission components 71 is shorter in the axial direction, and the abutment portion 80 of the first embodiment is not formed. In addition, a wave spring 72 is interposed between the base plate portion 75 and the flange component 270. Furthermore, the circular cylinder-shaped protruding portion 67 of the piston-side spring bearing 35 extends beyond the transmission component 71 as far as the piston 15 side. A plurality of passage holes 272 are formed penetrating the protruding portion 67 in a radial direction.

In addition, in the shock absorber 5 of the second embodiment, the plurality of disks 85, the opening/closing disk 86, the plurality of intermediate disks 87, the abutment disk 88, the passage forming component 89, the interposed portion 90, and the nut 91 are not provided. Accordingly, the male screw 61 onto which the nut 91 is screwed is not formed on the piston rod 18, and the distance between the passage hole 49 and the step surface 225 is also shortened.

Moreover, in the shock absorber 5 of the second embodiment, the compression-side damping valve main body 182, the plurality of disks 183, the seat component 184, and the valve regulating portion 186 are not provided. In the shock absorber 5 of the second embodiment, the compression-side disk 185 opens and closes the passage 112 by abutting directly against the seat portion 118 of the piston 15. In other words, the compression-side disk 185 and the seat portion 118 of the piston 15 form a disk valve 213 which is a damping valve.

A pressing mechanism 274 is interposed between the step surface 225 of the piston rod 18 and the opposite side from the piston 15 side of the disk 185. This pressing mechanism 274 is formed by a pressing spring 277 that is formed by a spring bearing 275, a spring bearing 276, and a coil spring.

In the shock absorber 5 of the second embodiment, the spring bearing 275 has a circular cylinder-shaped portion 280, and a flange portion 281 that extends outwards in a radial direction from one end in the axial direction of the circular cylinder-shaped portion 280. When the mounting shaft portion 59 of the piston rod 18 has been inserted inside the circular cylinder-shaped portion 280, the spring bearing 275 abuts against the step surface 225 via the end portion 281 side thereof. Outer circumferential portions of the circular cylinder-shaped portion 280 are formed by a large diameter portion 282 on the flange portion 281 side, and by a small diameter portion 283 on the opposite side from the flange portion 281. The diameter of the small diameter portion 283 is smaller than the diameter of the large diameter portion 282.

The spring bearing 276 has a circular cylinder-shaped portion 286, and a flange portion 287 that extends outwards in a radial direction from one end in the axial direction of the circular cylinder-shaped portion 286. A protruding portion 288 that has an annular shape in an intermediate position in the radial direction, and that protrudes in the axial direction on the opposite side from the circular cylinder-shaped portion 286 is formed on the flange portion 287. When the flange portion 287 is facing towards the piston 15 side, in the circular cylinder-shaped portion 286, the spring bearing 276 fits into the small diameter portion 283 of the spring bearing 275. The spring bearing 276 is able to move in the axial direction within the range of the small diameter portion 283.

The pressing spring 277 is interposed between the flange portion 281 of the spring bearing 275, and the flange portion 287 of the spring bearing 276. The pressing spring 277 causes the spring bearing 276 to abut via the protruding portion 288 thereof against the disk 185 of the disk valve 213 on the opposite side thereof from the piston 15 side. Moreover, when the spring bearing 276 receives force from the disk 185 in the opposite direction from the piston 15, it slides along the small diameter portion 283 of the spring bearing 275 while resisting the urging force of the pressing spring 287, and allows deformation in a direction moving away from the seat portion 118 of the disk 185.

When the piston rod 18 moves more than a predetermined value in the protruding direction, in the same way as in the first embodiment, the spring mechanism (i.e., a damping force adjustment mechanism, a spring device) 100 causes the piston-side spring bearing 35 to move in the direction of the piston 15 at the same time as it is compressing the rebound spring 38. At this time, as is shown on the left side of the centerline in FIG. 13, the transmission component 71 and the flange component 270 that is fixed to the piston rod 18 squash the wave spring 72 in resistance to the urging force thereof. As a result of this, the transmission component 71 and the piston-side spring bearing 35 are made to move slightly in the axial direction towards the flange component 270 side. Consequently, the circular cylinder-shaped protruding portion 67 of the piston-side spring bearing 35 is pressed against the flange portion 287 of the spring bearing 276. Because of this, the urging force from the rebound spring 38 of the spring mechanism 100 directly acts on the disk 185 of the disk valve 213 in the valve-closing direction. Moreover, when the urging force of the spring mechanism 100 is released, as is shown on the right side of the centerline in FIG. 13, the transmission component 71 and the piston-side spring bearing 35 are moved slightly in the axial direction by the urging force of the wave spring 72 towards the opposite side from the flange component 270. As a result of this, the urging force of the rebound spring of the spring mechanism 100 is no longer acting on the disk 185 of the disk valve 213. In other words, the disk mechanism 100 is able to adjust the opening angle of the disk valve 213 which is serving as a damping valve.

Figure 14:
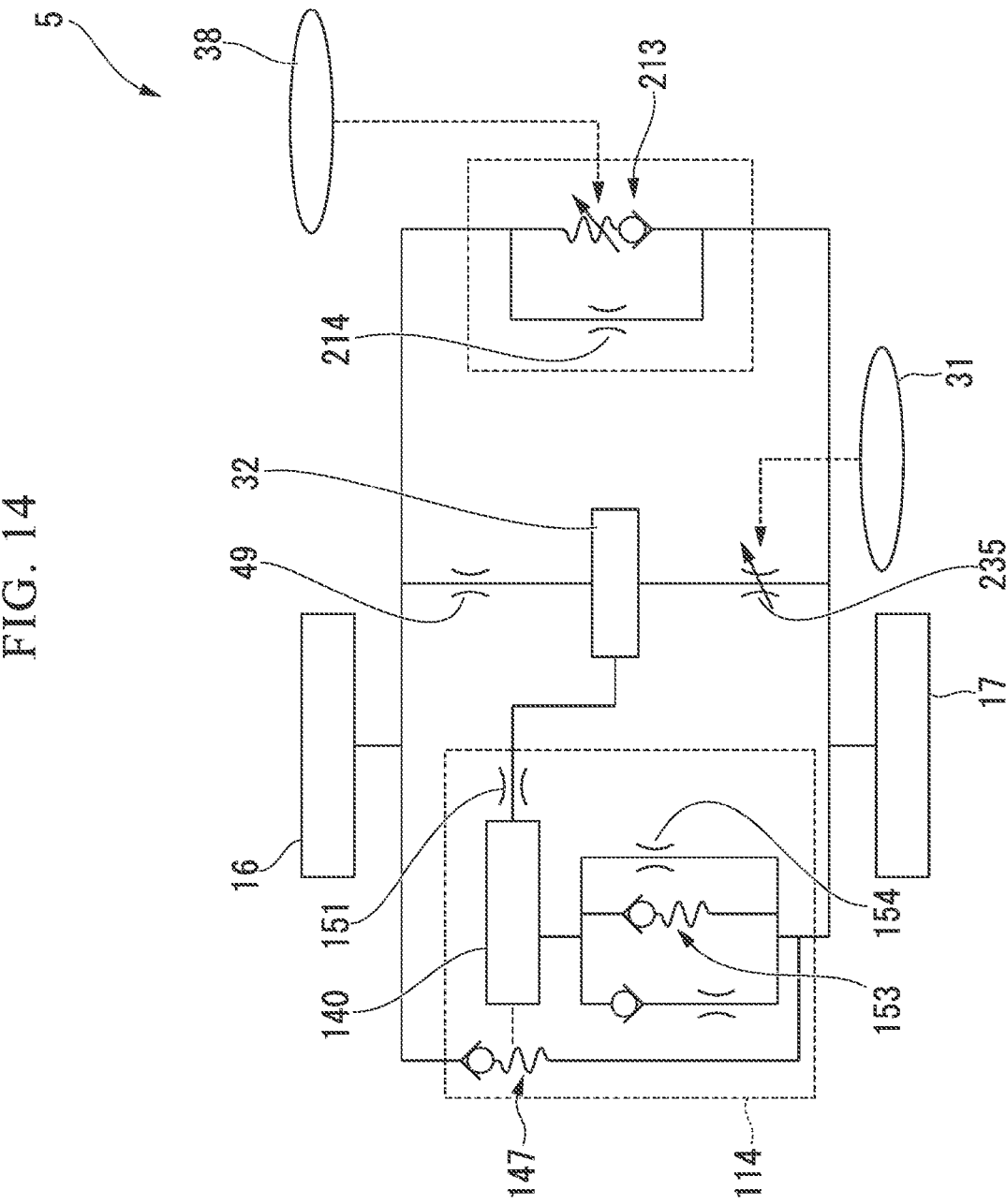
FIG. 14 is a hydraulic circuit diagram of the shock absorber shown in FIG. 13.

A hydraulic circuit diagram of the shock absorber 5 of the second embodiment which has the above-described structure is shown in FIG. 14. Namely, the same type of extension-side damping force generating mechanism 114 and compression-side disk valve 213 as are used in the shock absorber 5 of the first embodiment are provided in parallel with each other between the upper chamber 16 and the lower chamber 17. In addition, in the same way as in the first embodiment, a structure is employed in which the pilot chamber 140 of the damping force generating mechanism 114 is in communication via the orifice 151 with the rod internal passage 32, and the urging force from the rebound spring 38 acts on the compression-side disk valve 213.

In the shock absorber 5 of the second embodiment, within a maximum length-side predetermined range, which is where the piston rod 18 extends outwards from the cylinder 11 beyond a maximum length-side predetermined position, the spring mechanism 100 including the rebound spring 38 is contracted in length. As a result of this, the piston-side spring bearing 35 of the spring mechanism 100 squashes the wave spring 72 between itself and the spring bearing 276 via the transmission component 71, and urges the disk 185 of the disk valve 213 in the valve-closing direction. The passage area adjustment mechanism 236 matches the inner flange portion 232 to the position in the axial direction of the small diameter shaft portion 234 of the metering pin 31, and sets the passage area of the orifice 235 to its maximum. In this maximum length-side predetermined range, the rod internal passage 32 is in communication with the lower chamber 17 via the orifice 235. Meanwhile, the rod internal passage 32 is in communication with the upper chamber 16 via the passage hole 49 which is serving as an orifice of the piston rod 18.

Within this maximum length-side predetermined range, on the extension stroke when the piston 18 extends outside the cylinder 11, the piston 15 moves to the upper chamber 16 side, and the pressure inside the upper chamber 16 increases while the pressure inside the lower chamber 17 decreases. As a result, the pressure inside the upper chamber 16 acts on the damping valve main body 122 of the damping valve 147 of the extension-side damping force generating mechanism 114 via the extension-side passages 111 that are formed in the piston 15. At this time, the pilot chamber 140 that is causing pilot pressure to act on the damping valve main body 122 in the direction of the seat portion 117 is in communication with the lower chamber 17 via the orifice 235, the rod internal passage 32, and the pilot chamber intake passage 141, and is also in communication with the upper chamber 16 via the rod internal passage 32, the passage hole 49, and the passage hole 272 in the piston-side spring bearing 35. Because of this, the pilot chamber 140 changes to an intermediate pressure state between these two chambers, and the pilot pressure decreases. Accordingly, the differential pressure received by the damping valve main body 122 increases, so that the damping valve main body 122 is able to move away comparatively easily from the seat portion 117 and open up, and thereby allow oil to flow to the lower chamber 17 side via the passage 148 that extends in the radial direction between the piston 15 and the seat component 124. As a result of this, the damping pressure decreases. Namely, the extension-side damping force changes to a soft state.

Moreover, within this maximum length-side predetermined range, on the compression stroke when the piston rod 18 is retracted inside the cylinder 11, the piston 15 moves towards the lower chamber 17 side, and the pressure inside the lower chamber 17 increases while the pressure inside the upper chamber 16 decreases. As a consequence of this, the pressure inside the lower chamber 17 is applied, via the compression-side passages 112 that are formed in the piston 15, to the disk 185 of the compression-side disk valve 213. At this time, because the spring mechanism 100 is applying urging force to the disk 185 in the direction of the seat portion 118 via the spring bearing 276, it becomes difficult for the disk valve 213 to open, and the compression-side damping force becomes higher than the extension-side damping force during the extension stroke so as to be in a hard state.

In contrast, within a minimum length-side predetermined range, which is where the piston rod 18 is retracted inside the cylinder 11 beyond a minimum length-side predetermined position, the rebound spring 38 is not compressed, and the disk 185 of the disk valve 213 change to a state in which it is not pressed by the spring mechanism 100 which includes the rebound spring 38. Moreover, the passage area adjustment mechanism 236 matches the internal flange portion 223 to the position in the axial direction of the large diameter shaft portion 232 of the metering pin 31, and thereby blocks off the orifice 235. Within this minimum length-side predetermined range, the rod internal passage 32 is in communication with the upper chamber 16 via the passage hole 49 in the piston rod 18, and the pilot chamber 140 of the extension-side damping force generating mechanism 114 is in communication via the rod internal passage 32 only with the upper chamber 16.

Within this minimum length-side predetermined range, on the extension stroke when the piston rod 18 extends to the outside of the cylinder 11, the piston 15 moves to the upper chamber 16 side, and the pressure inside the upper chamber 16 increases while the pressure inside the lower chamber 17 decreases. As a consequence of this, the pressure inside the upper chamber 16 acts, via the extension-side passages 111 that are formed in the piston 15, on the damping valve main body 122 of the damping valve 147 of the extension-side damping force generating mechanism 114. At this time, the pilot chamber 140, which causes pilot pressure to be applied to the damping valve main body 122 in the direction of the seat portion 117, is in communication with the upper chamber 16 via the passage hole 49 in the piston rod 18, the rod internal passage 32, and the pilot chamber intake passage 141. Because of this, the pilot chamber 140 is placed in a pressure state close to that of the upper chamber 16, and not only does the pressure inside the upper chamber 16 increase but the pilot pressure also increases.

In this state, in the same way as in the shock absorber 5 of the first embodiment, the differential pressure received by the damping valve main body 122 decreases, so that it becomes difficult for the damping valve main body 122 to move away from the seat portion 117. As a result, the damping force in the extension stroke increases so that the extension-side damping force changes to a hard state.

Moreover, within this minimum length-side predetermined range, on the compression stroke when the piston rod 18 is retracted inside the cylinder 11, the piston 15 moves to the lower chamber 17 side, and the pressure inside the lower chamber 17 increases while the pressure inside the upper chamber 16 decreases. As a consequence of this, the hydraulic pressure inside the lower chamber 17 acts, via the compression-side passages 112 that are formed in the piston 15, on the disk 185 of the compression-side disk valve 213. At this time, because the disk 185 is not being pressed by the spring mechanism 100 which includes the rebound spring 38, it is easy for it to move away from the seat portion 118, and the oil in the compression-side passages 112 opens the disk 185 at the same time as it causes the spring bearing 276 of the pressing mechanism 274 to move in resistance to the urging force of the pressing spring 277, and then flows into the upper chamber 16 side via the gap between the piston 15 and the disk 185. As a result of this, the damping force in the compression stroke is less than the damping force in the extension stroke, so that the compression-side damping force is in a soft state.

According to the shock absorber 5 of the above-described second embodiment, is possible to obtain position-sensitive compression-side damping force characteristics at low cost.

Third Embodiment

Figure 15:
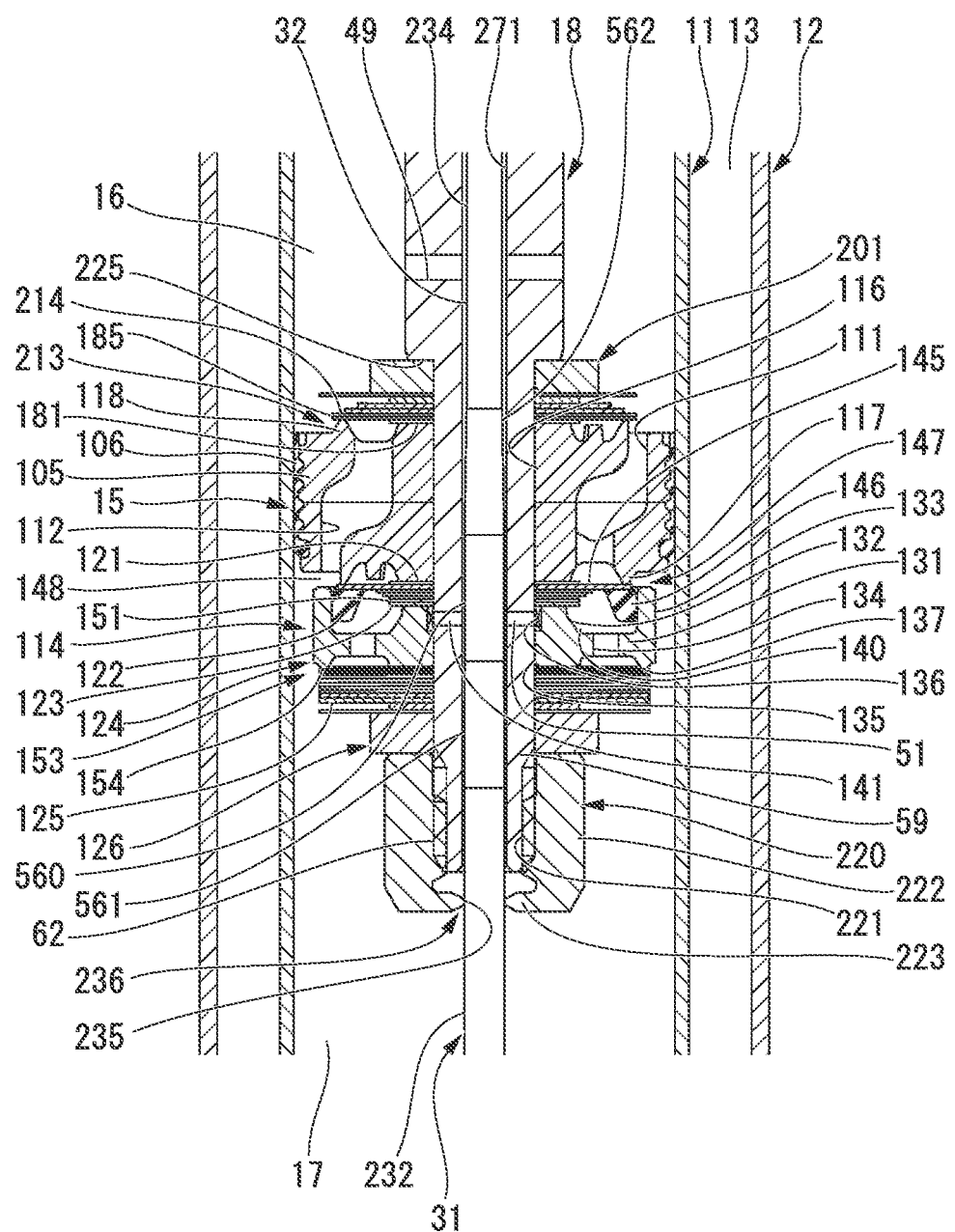
FIG. 15 is a cross-sectional view showing principal portions of a shock absorber that forms part of a suspension device according to a third embodiment of the present invention.

Next, a third embodiment will be described concentrating on portions thereof that are different from the second embodiment based mainly on FIG. 15 and FIG. 16. Note that the same designations and the same symbols are used to express portions that are the same as in the second embodiment.

In the third embodiment, the transmission component 71, the wave spring 72, and the pressing mechanism 274 of the second embodiment are not provided. Furthermore, the flange component 270 and the piston-side spring bearing 35 are provided at positions not shown in FIG. 15 such that they are able to move away from the disk 185.

In addition, an intermediate diameter shaft portion 560 having a constant diameter that is smaller than the diameter of the large diameter shaft portion 232 yet larger than the diameter of the small diameter shaft portion 234 is formed between the large diameter shaft portion 232 and the small diameter shaft portion 234 of the metering pin 31. A tapered shaft portion 561 is formed between the large diameter shaft portion 232 and the intermediate diameter shaft portion 560. A tapered shaft portion 562 is formed between the intermediate diameter shaft portion 560 and the small diameter shaft portion 234. The tapered shaft portion 561 is connected to an end portion on the intermediate diameter shaft portion 560 side of the large diameter shaft portion 232 and is also connected to an end portion on the large diameter shaft portion 232 side of the intermediate shaft portion 560, and is formed in a tapered shape whose diameter becomes gradually smaller as it moves towards the intermediate diameter shaft portion 560 side so as to connect these two together. The tapered shaft portion 562 is connected to an end portion on the small diameter shaft portion 234 side of the intermediate diameter shaft portion 560 and is also connected to an end portion on the intermediate diameter shaft portion 560 side of the small diameter shaft portion 234, and is formed in a tapered shape whose diameter becomes gradually smaller as it moves towards the small diameter shaft portion 234 side so as to connect to these two together.

Figure 16:
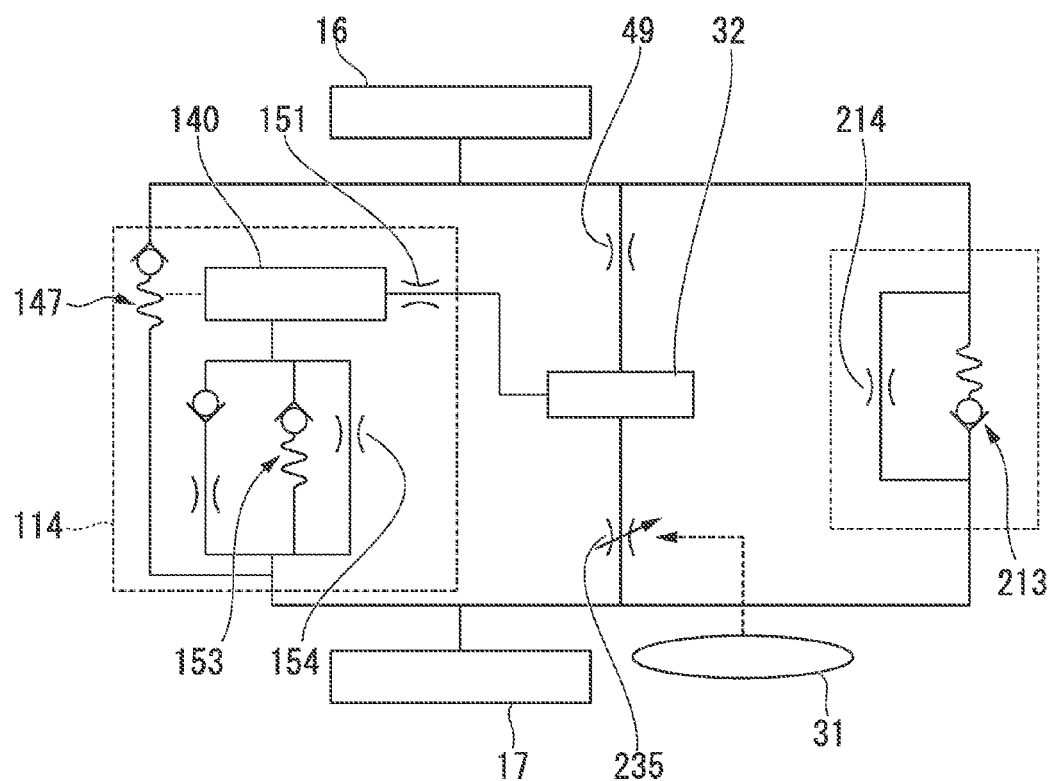
FIG. 16 is a hydraulic circuit diagram of the shock absorber shown in FIG. 15.

A hydraulic circuit diagram of the third embodiment having the above-described structure is shown in FIG. 16. Namely, in contrast to the second embodiment, a structure is employed here in which the urging force of the rebound spring 38 is not applied to the compression-side disk valve 213.

In a shock absorber of the third embodiment, even in the maximum length-side predetermined range, which is where the piston rod 18 extends out from the cylinder 11 beyond a maximum length-side predetermined position, the rebound spring (not shown) does not urge the disk 185 of the disk valve 213 in the valve closing direction. On the other hand, the passage area adjustment mechanism 236 matches the internal flange portion 223 to the position in the axial direction of the small diameter shaft portion 234 of the metering pin 31 so as to set the passage area of the orifice 235 to its maximum. In this maximum length-side predetermined range, the rod internal passage 32 is in communication with the lower chamber 17 via the orifice 235. Moreover, the rod internal passage 32 is also in communication with the upper chamber 16 via the passage whole 49 which is serving as an orifice in the piston rod 18.

In this maximum length-side predetermined range, in an extension stroke in which the piston rod 18 extends to the outside of the cylinder 11, the pressure inside the pilot chamber 140 is at an intermediate pressure between that of the upper chamber 16 and the lower chamber 17, and in the same way as in the second embodiment the damping force is reduced. Namely, the extension-side damping force is in a soft state.

Moreover, in this maximum length-side predetermined range, in a compression stroke in which the piston rod 18 is retracted inside the cylinder 11, the piston 15 moves to the lower chamber 17 side so that the pressure inside the lower chamber 17 increases while the pressure inside the upper chamber 16 decreases. As a consequence, the hydraulic pressure inside the lower chamber 17 acts, via the compression-side passages 112 that are formed in the piston 15, on the other side of the disk 185 of the compression-side disk valve 213 which is also receiving pressure from the upper chamber 16 from the one side thereof. As a result of this, the differential pressure acting on the disk 185 increases, so that it becomes easy for the disk valve 213 to open, and the compression-side damping force also changes to a soft state.

In contrast, in the minimum length-side predetermined range, which is where the piston rod 18 is retracted inside the cylinder 11 beyond a minimum length-side predetermined position, the passage area adjustment mechanism 236 matches the internal flange portion 223 to the position in the axial direction of the large diameter shaft portion 232 of the metering pin 31, and thereby blocks off the orifice 235. Within this minimum length-side predetermined range, the rod internal passage 32 is in communication with the upper chamber 16 via the passage hole 49 in the piston rod 18, and the pilot chamber 140 of the extension-side damping force generating mechanism 114 is in communication via the rod internal passage 32 only with the upper chamber 16.

Within this minimum length-side predetermined range, on the extension stroke when the piston rod 18 extends to the outside of the cylinder 11, the piston 15 moves to the upper chamber 16 side, and the pressure inside the upper chamber 16 increases while the pressure inside the lower chamber 17 decreases. At this time, in the same way as in the second embodiment, the pilot chamber 140 is in communication with the upper chamber 16. Because of this, the pilot chamber 140 is placed in a pressure state close to that of the upper chamber 16, and the differential pressure acting on the damping valve main body 122 decreases. As a consequence, the damping force on the extension stroke increases, so that the extension-side damping force is in a hard state.

Moreover, within this minimum length-side predetermined range, on the compression stroke when the piston rod 18 is retracted inside the cylinder 11, the piston 15 moves to the lower chamber 17 side, and the pressure inside the lower chamber 17 increases while the pressure inside the upper chamber 16 decreases. As a consequence of this, the hydraulic pressure inside the lower chamber 17 acts, via the compression-side passages 112 that are formed in the piston 15, on the other side of the disk 185 of the compression-side disk valve 213 which is also receiving pressure from the upper chamber 16 from the one side thereof. As a result of this, the differential pressure acting on the disk 185 increases, so that it becomes easy for the disk valve 213 to open, and the compression-side damping force changes to a soft state.

Moreover, when the piston rod 18 is located in an intermediate predetermined range between the maximum length-side predetermined position and the minimum length-side predetermined position, the passage area adjustment mechanism 236 matches the inner flange portion 223 to the position in the axial direction of the intermediate diameter shaft portion 560 of the metering pin 31, so as to make the passage area of the orifice 235 wider than the minimum length-side predetermined range, but narrower than the maximum length-side predetermined position. In this intermediate predetermined range, the pressure inside the pilot chamber 140 is closer to the pressure in the upper chamber 16 than when the piston rod 18 is in the minimum length-side predetermined range.

Accordingly, on the extension stroke, because the pressure inside the pilot chamber 140 is higher than when the piston rod 18 is in the minimum length-side predetermined range, the differential pressure received by the damping valve main body 122 of the damping valve 147 of the extension-side damping force generating mechanism 114 is somewhat reduced. Because of this the damping force is in a medium state which is lower than when it is in a hard state in the minimum length-side predetermined range, but higher than when it is in a soft state in the maximum length-side predetermined range. On the other hand, on the compression stroke, in the same way as for the maximum length-side predetermined position and the minimum length-side predetermined range, the damping force is low so that the compression-side damping force is in a soft state.

According to the above-described third embodiment, it is possible to obtain from the passage area adjustment mechanism 236 that adjusts the passage area of the orifice 235 using the position of the piston rod 18 the characteristics that, within the maximum length-side predetermined range where the piston rod 18 extends outside the cylinder 11 beyond the maximum length-side predetermined position, both the extension-side damping force in the compression-side damping force are in a soft state, and within the minimum length-side predetermined range where the piston rod 18 is retracted inside the cylinder 11 beyond the minimum length-side predetermined position, the extension-side damping force is in a hard state and the compression-side damping force is in a soft state. In this manner, because the passage area of the orifice 235 through which the operating fluid circulates is adjusted, it becomes possible to smoothly change the damping force and thereby improve the riding comfort of a vehicle.

Fourth Embodiment

Figure 17:
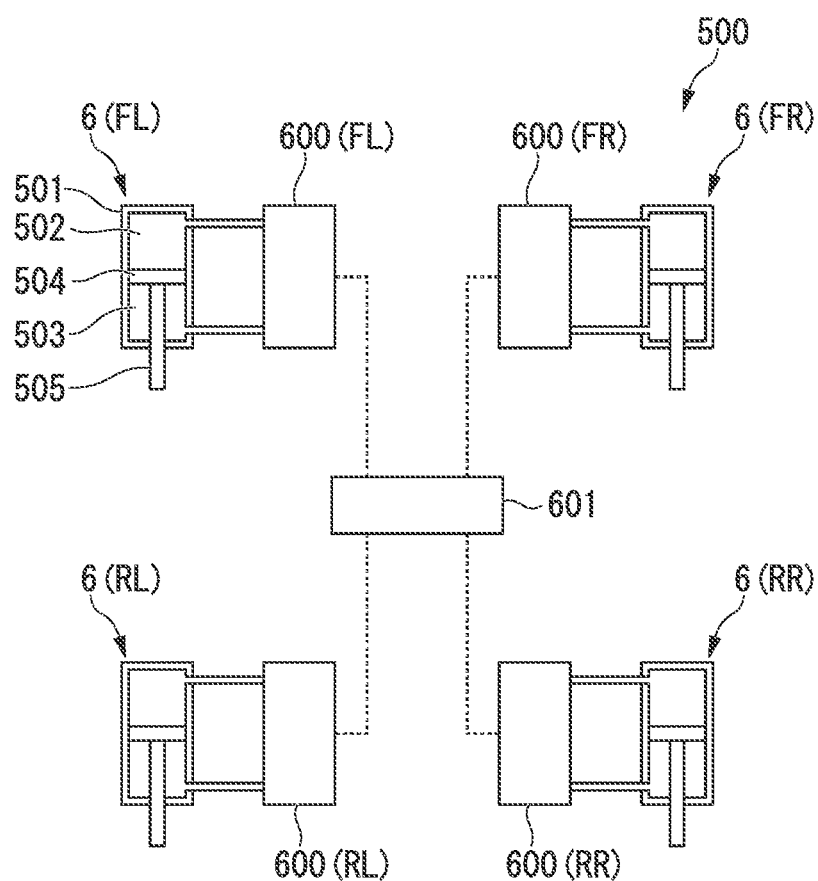
FIG. 17 is a hydraulic circuit diagram showing an operating force adjustment mechanism that forms part of a suspension device according to a fourth embodiment of the present invention.

Next, a fourth embodiment will be described concentrating on portions thereof that are different from the first embodiment based mainly on FIG. 17 and FIG. 18. Note that the same designations and the same symbols are used to express portions that are the same as in the first embodiment.

In the fourth embodiment, an operating force adjustment mechanism 500 that is different from that used in the first embodiment is used. In the operating force adjustment mechanism 500 of the fourth embodiment, a supply/discharge control unit 600 is provided that controls the supply and discharge of oil to an upper chamber 502 and a lower chamber 503 of the cylinder device 6. A supply/discharge control unit 600 (FL) that controls the cylinder device 6 (FL), a supply/discharge control unit 600 (FR) that controls the cylinder device 6 (FR), a supply/discharge control unit 600 (RL) that controls the cylinder device 6 (RL), and a supply/discharge control unit 600 (RR) that controls the cylinder device 6 (RR) are connected to a control unit 601 that controls these cylinder devices 6. Signals from various types of sensors such as a vehicle speed sensor that is used to detect the roll and pitch of the vehicle body 2, and a steering angle sensor and the like are input into the control unit 601.

When the control unit 601 detects from the signals from the various sensors that the vehicle is pitching, it suppresses the pitching by limiting the supply and discharge of oil to the upper chamber 502 and the lower chamber 503 of the cylinder device 6 (FL) using the supply/discharge control unit 600 (FL), and by limiting the supply and discharge of oil to the upper chamber 502 and the lower chamber 503 of the cylinder device 6 (FR) using the supply/discharge control unit 600 (FR), and by limiting the supply and discharge of oil to the upper chamber 502 and the lower chamber 503 of the cylinder device 6 (RL) using the supply/discharge control unit 600 (RL), and by limiting the supply and discharge of oil to the upper chamber 502 and the lower chamber 503 of the cylinder device 6 (RR) using the supply/discharge control unit 600 (RR).

Moreover, when the control unit 601 detects from the signals from the various sensors that the vehicle is rolling, it suppresses the rolling by limiting the supply and discharge of oil to the upper chamber 502 and the lower chamber 503 of the cylinder device 6 (FL) using the supply/discharge control unit 600 (FL), and by limiting the supply and discharge of oil to the upper chamber 502 and the lower chamber 503 of the cylinder device 6 (FR) using the supply/discharge control unit 600 (FR), and by limiting the supply and discharge of oil to the upper chamber 502 and the lower chamber 503 of the cylinder device 6 (RL) using the supply/discharge control unit 600 (RL), and by limiting the supply and discharge of oil to the upper chamber 502 and the lower chamber 503 of the cylinder device 6 (RR) using the supply/discharge control unit 600 (RR).

In other words, the operating force adjustment mechanism 500 of the fourth embodiment is able to adjust the operating force in both the roll direction and the pitch direction of the vehicle body 2. More specifically, the operating force adjustment mechanism 500 adjusts the roll rigidity and pitch rigidity in order to suppress any rolling and any pitching that are generated by the acceleration of the vehicle body 2 in a horizontal direction. Note that, if the operating force adjustment mechanism 500 of the fourth embodiment is used, then it is also possible to adjust only one of the roll rigidity and the pitch rigidity so as to suppress just one of the rolling or the pitching of a vehicle body 2. Note also that, for example, when a vehicle is traveling on a corrugated road surface which causes bouncing to occur, or when a vehicle rolls in opposite directions between the front and rear, the control unit 601 is set up such that it does not limit the supply and discharge of oil in the upper chambers 502 and lower chambers 503 of the cylinder devices 6 (FL), 6 (FR), 6 (RL), and 6 (RR) by the supply/discharge control units 600 (FL), 600 (FR), 600 (RL), and 600 (RR) so that the riding comfort provided by the position-sensitive shock absorbers 5 is not obstructed.

Figure 18:
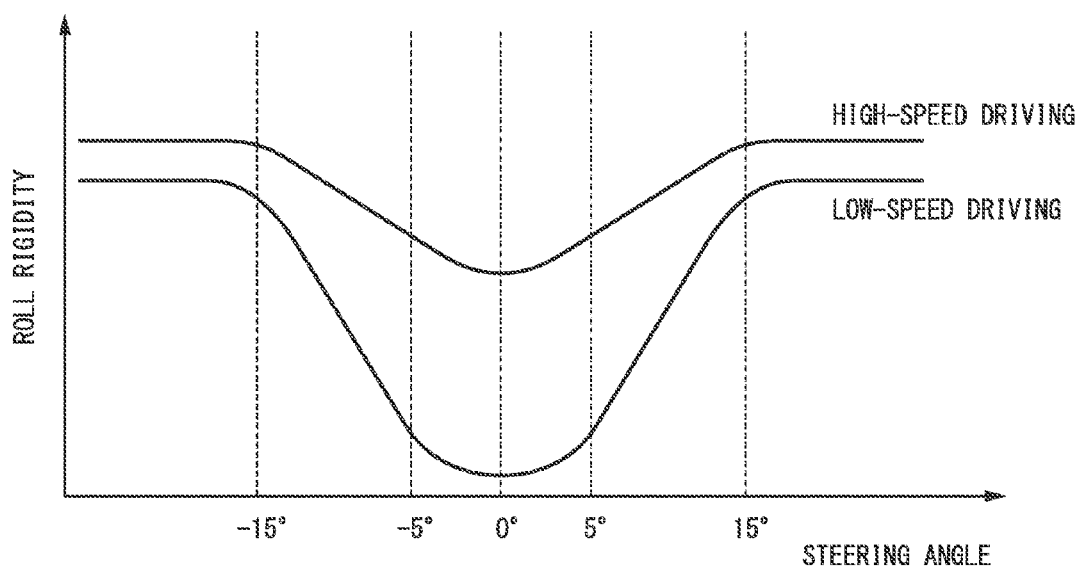
FIG. 18 is a characteristic line diagram showing an example of a relationship between the rolling rigidity generated by the operating force adjustment mechanism shown in FIG. 17 and the steering angle and vehicle speed.

Here, an example of a relationship between the roll rigidity generated by the operating force adjustment mechanism 500 of the fourth embodiment and the steering angle and vehicle speed is shown in FIG. 18. For example, from the standpoint of the steering angle, when the vehicle is traveling in a straight line so that the steering angle is small, the operating force adjustment mechanism 500 sets a low roll rigidity, and gradually increases the roll rigidity during cornering in accordance with the increasing steering angle. By doing this, it is possible to suppress the roll amount and roll rate during cornering. Moreover, when the vehicle is traveling at low speed (for example, 30 km/h or less) such as when it is traveling over a poor road surface or is cornering at a small turning radius, the roll rigidity is set to low over the entire steering range, and the amount of change obtained from the steering is increased. When the vehicle is traveling at high speed (for example, 100 km/h or more), the roll rigidity is set to high over the entire steering range, and the amount of change is decreased. By setting the roll rigidity to high over the entire steering range, the straight line performance of the vehicle when it is traveling at high speed is improved.

Note that, in addition to signals from the vehicle speed sensor and the steering angle sensor that are input into the control unit 601 of the operating force adjustment mechanism 500, if a structure is employed in which it is also possible for signals from a lateral acceleration sensor and a yaw rate sensor to be input, then even more accurate roll control becomes possible, and the effects provided by the functions of the position-sensitive shock absorber 5 can be increased even more. Note that lateral acceleration sensors are used in general roll control systems such as active stabilizer devices and the like. Yaw rate sensors are used in vehicle stability control systems and, more specifically, are formed by gyro sensors.

According to the above-described embodiment, a suspension device that is positioned between a vehicle body and a vehicle wheel is provided with: a shock absorber that has a cylinder inside which an operating fluid is sealed, a piston that is slidably fitted inside the cylinder and divides the cylinder interior into two chambers, a piston rod that is joined to the piston and also extends to the outside of the cylinder, a passage that connects together the two chambers such that the operating fluid is able to flow between them as a result of a movement of the piston, a damping force generating mechanism that is provided in the passage and generates damping force by suppressing the flow of the operating fluid that occurs as a result of the movement of the piston, and a damping force adjustment mechanism that is able to alter the damping force by means of the position of the piston such that at least any one of the following characteristics are achieved, namely, first characteristics in which, within a range where the piston rod is extending out from the cylinder beyond a first predetermined position, the extension-side damping force is in a soft state and the compression-side damping force is in a hard state, and second characteristics in which, within a range where the piston rod is retracted inside the cylinder beyond a second predetermined position, the extension-side damping force is in a hard state and the compression-side damping force is in a soft state; and an operating force adjustment mechanism that is able to adjust at least one operating force out of the operating force in the roll direction of a vehicle, and the operating force in a pitch direction of the vehicle. Because this structure makes it possible for the shock absorber to alter the damping force by means of the position of the piston rod, the riding comfort of a vehicle in which it is installed is excellent. Moreover, as a result of the operating force adjustment mechanism adjusting at least one of the operating force in the roll direction of a vehicle, and the operating force in a pitch direction of the vehicle, it is possible for at least one of the roll and the pitch of a vehicle to be reduced, and for the handling stability of the vehicle to thereby be improved.

Moreover, because the operating force adjustment mechanism adjusts at least one of a roll rigidity and a pitch rigidity such that at least one of the roll and the pitch of the vehicle that are generated by an acceleration of the vehicle in a horizontal direction are suppressed, the handling stability can be improved.

Moreover, the damping force generating mechanism has a damping valve. Because the damping force adjustment mechanism is a spring device that is able to adjust the opening angle of the damping valve, the damping force can be altered easily by means of a simple structure using the position of the piston rod.

Moreover, a second passage that connects the two chambers together such that an operating fluid is able to flow between them via the damping force adjustment mechanism is provided, and a passage area adjustment mechanism that adjusts the passage area using the position of the piston rod is provided in the second passage. Because of this, it is possible to smoothly change the damping force of the shock absorber by means of a simple structure.

Moreover, because the passage area adjustment mechanism adjusts the second passage by means of a metering pin, it is possible to stably adjust the passage area in accordance with the position of the piston rod, and to obtain stable damping force characteristics.

Moreover, the damping force generating mechanism is a damping valve on at least either one of the extension side and the compression side. The damping valve on at least one of the extension side and the compression side is a pilot-type damping valve having a pilot chamber. The second passage is connected to the pilot chamber. Because of this, the damping force can be adjusted even more smoothly.

Moreover, because the second passage has a passage on at least one of the extension side and the compression side that has a check valve, it is possible using the check valve to easily change at least one of the extension-side damping force and the compression-side damping force to a soft state.

In each of the above-described embodiments, an example has been described in which the shock absorber 5 is a double-barrel hydraulic shock absorber, however, the present invention is not limited to this, and it is also possible to employ a variety of shock absorbers such as a monotube hydraulic shock absorber in which the outer cylinder has been done away with, and a gas chamber is formed by a slidable dividing body on an opposite side from the upper chamber 16 side in the lower chamber 17 of the cylinder 11. Moreover, it is also possible to use water or air instead of oil as the operating fluid in the shock absorber 5.

INDUSTRIAL APPLICABILITY

According to the above-described suspension device, it is possible to achieve an improvement in the riding comfort and an improvement in the handling stability of a vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

DESCRIPTION OF THE REFERENCE NUMERALS

1 Suspension device
2 Vehicle body
3 Vehicle wheel
5 Shock absorber
11 Cylinder
15 Piston
16 Upper chamber
17 Lower chamber
18 Piston rod
31 Metering pin
32 Rod internal passage (Second passage)
99 Passage (Second passage)
100 Spring mechanism (Damping force adjustment mechanism, Spring device)
101, 236, 343 Passage area adjustment mechanism (Damping force adjustment mechanism)
111, 112 Passages
114, 115 Damping force generating mechanism
140, 200 Pilot chamber (Second passage)
141, 201 Pilot chamber intake passage (Second passage)
147, 207 Damping valve
153 Disk valve
213 Disk valve (Damping valve)
235 Orifice (Second passage)
500 Operating force adjustment mechanism

What is claimed is:

1. A suspension device that is positioned between a vehicle body and a vehicle wheel, the suspension device comprising:
    at least one shock absorber comprising:
    a cylinder inside which an operating fluid is sealed;
    a piston that is slidably fitted inside the cylinder, and that divides the cylinder interior into two chambers;
    a piston rod that is joined to the piston and is configured to extend to the outside of the cylinder;
    a passage that connects together the two chambers such that the operating fluid is able to flow between the two chambers as a result of a movement of the piston;
    a damping force generating mechanism that is provided in the passage, and that generates damping force by suppressing the flow of the operating fluid that occurs as a result of the movement of the piston; and
    a damping force adjustment mechanism that is capable of altering the damping force by means of the position of the piston rod without an electronic control being performed such that at least any one of the following characteristics are achieved, first characteristics in which, within a range where the piston rod is extending out from the cylinder beyond maximum length-side predetermined position, an extension-side damping force is in a soft state and a compression-side damping force is in a hard state, and second characteristics in which, within a range where the piston rod is retracted inside the cylinder beyond a minimum length-side predetermined position, the extension-side damping force is in a hard state and the compression-side damping force is in a soft state; and
    an operating force adjustment mechanism provided separate from the shock absorber, the operating force adjustment mechanism being capable of adjusting at least one operating force from the operating force in a roll direction of a vehicle, and the operating force in a pitch direction of the vehicle.

2. The suspension device according to claim 1, wherein the operating force adjustment mechanism adjusts at least one of a roll rigidity and a pitch rigidity such that at least one of a roll and a pitch of the vehicle that are generated by an acceleration of the vehicle in a horizontal direction are suppressed.

3. The suspension device according to claim 1, wherein the operating force adjustment mechanism adjusts a roll rigidity and a pitch rigidity such that the roll and the pitch of the vehicle that are generated by an acceleration of the vehicle in a horizontal direction are suppressed.

4. The suspension device according to claim 1, wherein the operating force adjustment mechanism includes a cylinder device provided between a vehicle body and a vehicle wheel and having an upper chamber and a lower chamber inside which the operating fluid is sealed,
    and wherein the cylinder device generates at least one of an operating force in the roll direction of the vehicle body and an operating force in the pitch direction of the vehicle body by the operating fluid being supplied to one of the upper chamber and the lower chamber from an outside and being discharged from the other of the upper chamber and the lower chamber to the outside.

5. The suspension device according to claim 1,
wherein the at least one shock absorber is provided for each of four wheels that are a right front wheel, a left front wheel, a right rear wheel, and a left rear wheel, and
wherein the operating force adjusting mechanism comprises:
four cylinder devices each of which provided for each of the four wheels that are the right front wheel, the left front wheel, the right rear wheel, and the left rear wheel;
a first tube that connects an upper chamber of a first cylinder device that is provided on the left front wheel and a lower chamber of a second cylinder device that is provided on the right front wheel;
a second tube that connects a lower chamber of the first cylinder device and un upper chamber of the second cylinder device;
a third tube that connects an upper chamber of a third cylinder device that is provided on the left rear wheel and a lower chamber of a fourth cylinder device that is provided on the right rear wheel;
a fourth tube that connects an lower chamber of the third cylinder device and an upper chamber of the fourth cylinder device;
a fifth tube that connects the first tube and the third tube;
a sixth tube that connects the second tube and the fourth tube;
a first accumulator that is provided for the fifth tube; and
a second accumulator that is provided for the sixth tube.

6. The suspension device according to claim 1,
wherein the at least one shock absorber is provided for each of four wheels that are a right front wheel, a left front wheel, a right rear wheel, and a left rear wheel, and
wherein the operating force adjusting mechanism comprises:
four cylinder devices each of which provided for each of the four wheels that are the right front wheel, the left front wheel, the right rear wheel, and the left rear wheel;
four supply/discharge control units each of which provided for each of the four cylinder devices, wherein each of the four supply/discharge control units is configured to control supply/discharge of the operating fluid of an upper chamber and a lower chamber of each cylinder device; and
a control unit connected to the four supply/discharge control units to control the each supply/discharge control unit.

7. A suspension device that is positioned between a vehicle body and a vehicle wheel, the suspension device comprising:
at least one shock absorber comprising:
a cylinder inside which an operating fluid is sealed;
a piston that is slidably fitted inside the cylinder, and that divides the cylinder interior into two chambers;
a piston rod that is joined to the piston and is configured to extend to the outside of the cylinder;
a passage that connects together the two chambers such that the operating fluid is able to flow between the two chambers as a result of a movement of the piston;
a damping force generating mechanism that is provided in the passage, and that generates damping force by suppressing the flow of the operating fluid that occurs as a result of the movement of the piston; and
a damping force adjustment mechanism that is capable of altering the damping force by means of the position of the piston rod such that at least any one of the following characteristics are achieved, first characteristics in which, within a range where the piston rod is extending out from the cylinder beyond a maximum length-side predetermined position, an extension-side damping force is in a soft state and a compression-side damping force is in a hard state, and second characteristics in which, within a range where the piston rod is retracted inside the cylinder beyond a minimum length-side predetermined position, the extension-side damping force is in a hard state and the compression-side damping force is in a soft state; and
an operating force adjustment mechanism provided separate from the shock absorber, the operating force adjustment mechanism being capable of adjusting at least one operating force from the operating force in a roll direction of a vehicle, and the operating force in a pitch direction of the vehicle, wherein
the damping force generating mechanism includes a damping valve, and
the damping force adjustment mechanism is a spring device that is capable of adjusting the opening angle of the damping valve.

8. The suspension device according to claim 7, wherein the operating force adjustment mechanism includes a cylinder device provided between a vehicle body and a vehicle wheel and having an upper chamber and a lower chamber inside which the operating fluid is sealed,
and wherein the cylinder device generates at least one of an operating force in the roll direction of the vehicle body and an operating force in the pitch direction of the vehicle body by the operating fluid being supplied to one of the upper chamber and the lower chamber from an outside and being discharged from the other of the upper chamber and the lower chamber to the outside.

9. The suspension device according to claim 7,
wherein the at least one shock absorber is provided for each of four wheels that are a right front wheel, a left front wheel, a right rear wheel, and a left rear wheel, and
wherein the operating force adjusting mechanism comprises:
four cylinder devices each of which provided for each of the four wheels that are the right front wheel, the left front wheel, the right rear wheel, and the left rear wheel;
a first tube that connects an upper chamber of a first cylinder device that is provided on the left front wheel and a lower chamber of a second cylinder device that is provided on the right front wheel;
a second tube that connects a lower chamber of the first cylinder device and un upper chamber of the second cylinder device;
a third tube that connects an upper chamber of a third cylinder device that is provided on the left rear wheel and a lower chamber of a fourth cylinder device that is provided on the right rear wheel;
a fourth tube that connects an lower chamber of the third cylinder device and an upper chamber of the fourth cylinder device;
a fifth tube that connects the first tube and the third tube;
a sixth tube that connects the second tube and the fourth tube;

a first accumulator that is provided for the fifth tube; and
a second accumulator that is provided for the sixth tube.

10. The suspension device according to claim 7,
wherein the at least one shock absorber is provided for each of four wheels that are a right front wheel, a left front wheel, a right rear wheel, and a left rear wheel, and
wherein the operating force adjusting mechanism comprises:
four cylinder devices each of which provided for each of the four wheels that are the right front wheel, the left front wheel, the right rear wheel, and the left rear wheel;
four supply/discharge control units each of which provided for each of the four cylinder devices, wherein each of the four supply/discharge control units is configured to control supply/discharge of the operating fluid of an upper chamber and a lower chamber of each cylinder device; and
a control unit connected to the four supply/discharge control units to control the each supply/discharge control unit.

11. A suspension device that is positioned between a vehicle body and a vehicle wheel, the suspension device comprising:
at least one shock absorber comprising:
a cylinder inside which an operating fluid is sealed;
a piston that is slidably fitted inside the cylinder, and that divides the cylinder interior into two chambers;
a piston rod that is joined to the piston and is configured to extend to the outside of the cylinder;
a passage that connects together the two chambers such that the operating fluid is able to flow between the two chambers as a result of a movement of the piston;
a damping force generating mechanism that is provided in the passage, and that generates damping force by suppressing the flow of the operating fluid that occurs as a result of the movement of the piston; and
a damping force adjustment mechanism that is capable of altering the damping force by means of the position of the piston rod such that at least any one of the following characteristics are achieved, first characteristics in which, within a range where the piston rod is extending out from the cylinder beyond a maximum length-side predetermined position, an extension-side damping force is in a soft state and a compression-side damping force is in a hard state, and second characteristics in which, within a range where the piston rod is retracted inside the cylinder beyond a minimum length-side predetermined position, the extension-side damping force is in a hard state and the compression-side damping force is in a soft state; and
an operating force adjustment mechanism provided separate from the shock absorber, the operating force adjustment mechanism being capable of adjusting at least one operating force from the operating force in a roll direction of a vehicle, and the operating force in a pitch direction of the vehicle, wherein
a second passage that connects the two chambers together such that an operating fluid is capable of flowing between the two chambers via the damping force adjustment mechanism is provided, and
a passage area adjustment mechanism that adjusts a passage area using a position of the piston rod is provided in the second passage.

12. The suspension device according to claim 11, wherein the passage area adjustment mechanism adjusts the second passage by means of a metering pin.

13. The suspension device according to claim 11, wherein the damping force generating mechanism is a damping valve on at least either one of the extension side and the compression side, and the damping valve on at least one of the extension side and the compression side is a pilot-type damping valve having a pilot chamber, and the second passage is connected to the pilot chamber.

14. The suspension device according to claim 11, wherein the operating force adjustment mechanism includes a cylinder device provided between a vehicle body and a vehicle wheel and having an upper chamber and a lower chamber inside which the operating fluid is sealed,
and wherein the cylinder device generates at least one of an operating force in the roll direction of the vehicle body and an operating force in the pitch direction of the vehicle body by the operating fluid being supplied to one of the upper chamber and the lower chamber from an outside and being discharged from the other of the upper chamber and the lower chamber to the outside.

15. The suspension device according to claim 11,
wherein the at least one shock absorber is provided for each of four wheels that are a right front wheel, a left front wheel, a right rear wheel, and a left rear wheel, and
wherein the operating force adjusting mechanism comprises:
four cylinder devices each of which provided for each of the four wheels that are the right front wheel, the left front wheel, the right rear wheel, and the left rear wheel;
a first tube that connects an upper chamber of a first cylinder device that is provided on the left front wheel and a lower chamber of a second cylinder device that is provided on the right front wheel;
a second tube that connects a lower chamber of the first cylinder device and un upper chamber of the second cylinder device;
a third tube that connects an upper chamber of a third cylinder device that is provided on the left rear wheel and a lower chamber of a fourth cylinder device that is provided on the right rear wheel;
a fourth tube that connects an lower chamber of the third cylinder device and an upper chamber of the fourth cylinder device;
a fifth tube that connects the first tube and the third tube;
a sixth tube that connects the second tube and the fourth tube;
a first accumulator that is provided for the fifth tube; and
a second accumulator that is provided for the sixth tube.

16. The suspension device according to claim 11,
wherein the at least one shock absorber is provided for each of four wheels that are a right front wheel, a left front wheel, a right rear wheel, and a left rear wheel, and
wherein the operating force adjusting mechanism comprises:
four cylinder devices each of which provided for each of the four wheels that are the right front wheel, the left front wheel, the right rear wheel, and the left rear wheel;
four supply/discharge control units each of which provided for each of the four cylinder devices, wherein each of the four supply/discharge control units is configured to control supply/discharge of the operating fluid of an upper chamber and a lower chamber of each cylinder device; and a control unit connected to the four supply/discharge control units to control the each supply/discharge control unit.

* * * * *